United States Patent [19]
Halter et al.

[11] Patent Number: 5,274,636
[45] Date of Patent: Dec. 28, 1993

[54] AUTOMATIC MULTIPLEX DATA LINK SYSTEM, SYMBOL ENCODER DECODER THEREFOR

[75] Inventors: Richard A. Halter, Warren; William V. Luitje, Ann Arbor; Frederick O. Miesterfeld, Troy; Robert J. Randel, Farmington Hills, all of Mich.

[73] Assignee: Chrysler Corporation, Highland Park, Mich.

[21] Appl. No.: 871,259

[22] Filed: Apr. 20, 1992

[51] Int. Cl.⁵ .................... H04J 3/02; G05B 23/02
[52] U.S. Cl. .................... 370/85.1; 370/85.2; 370/85.8; 370/9; 340/825.08; 340/825.07
[58] Field of Search ............ 370/85.1, 85.2, 85.3, 370/85.8, 9; 340/825.5, 825.51, 825.06, 825.05, 825.52, 825.07, 825.08

[56] References Cited

U.S. PATENT DOCUMENTS

| | | | |
|---|---|---|---|
| 4,706,245 | 11/1987 | Suzuki et al. | 370/85.1 |
| 4,715,031 | 12/1987 | Crawford et al. | 370/85.1 |
| 4,739,323 | 4/1988 | Miesterfeld et al. | 340/825.5 |
| 4,739,324 | 4/1988 | Miesterfeld et al. | 340/825.5 |
| 4,899,338 | 2/1990 | Wroblewski | 370/85.1 |
| 4,964,076 | 10/1990 | Schurk | 340/825.5 |
| 4,973,954 | 11/1990 | Schwarz | 340/825.05 |
| 5,132,967 | 7/1992 | Kalajainen | 370/85.1 |

*Primary Examiner*—Douglas W. Olms
*Assistant Examiner*—Chau T. Nguyen
*Attorney, Agent, or Firm*—Wendell K. Fredericks

[57] ABSTRACT

A symbol encoder and decoder device for use with a microcontroller and a transceiver (forming a node) for encoding and decoding defined symbols made up of digital bits of various lengths and for transferring to and recovering symbol messages on a single wire bus of a multi-node multiplexed data link.

2 Claims, 15 Drawing Sheets

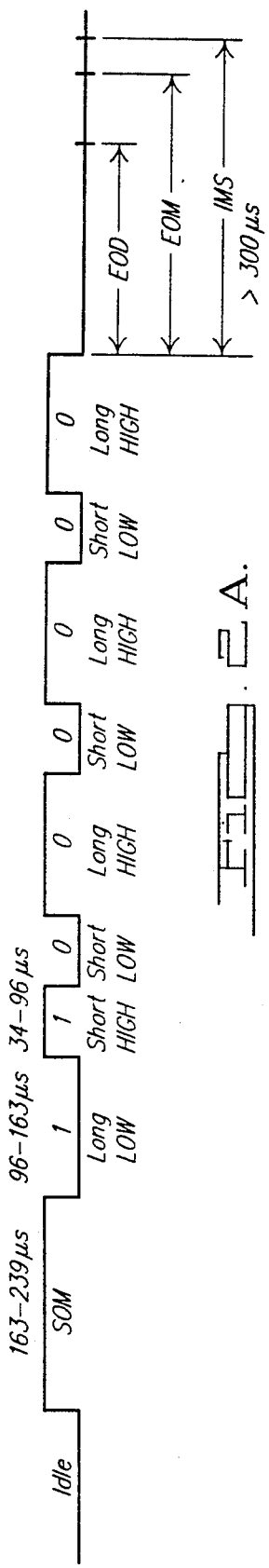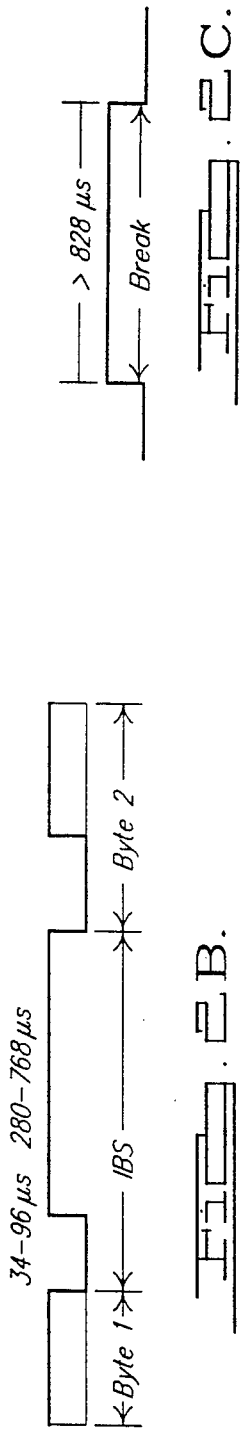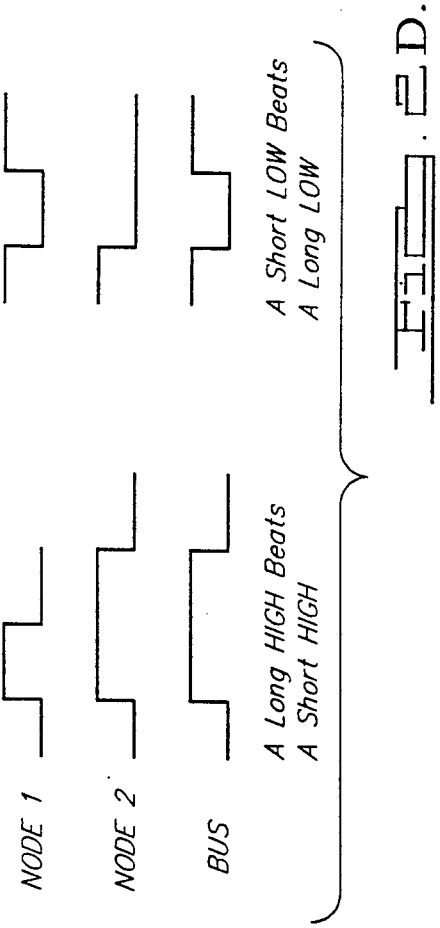

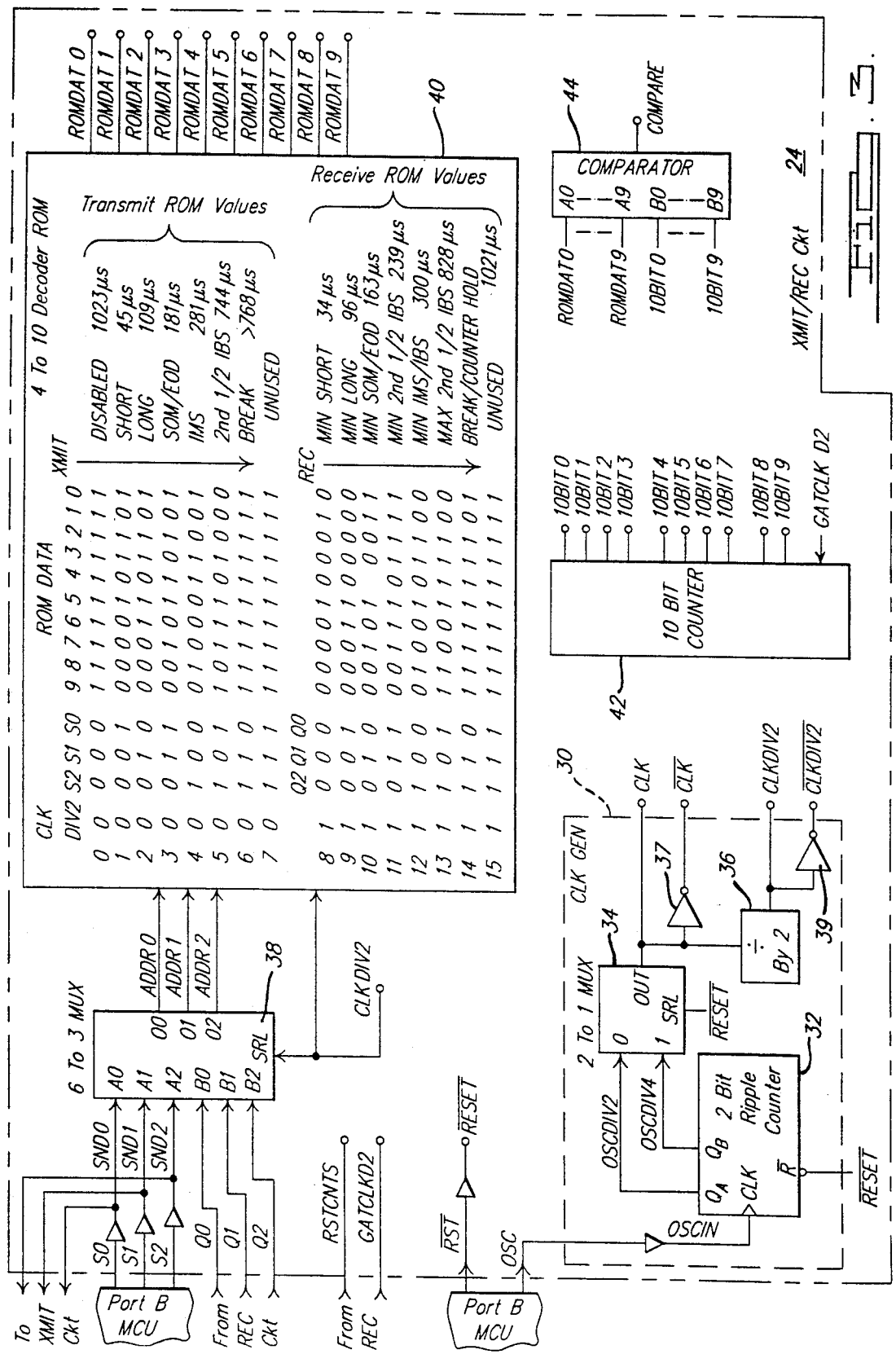

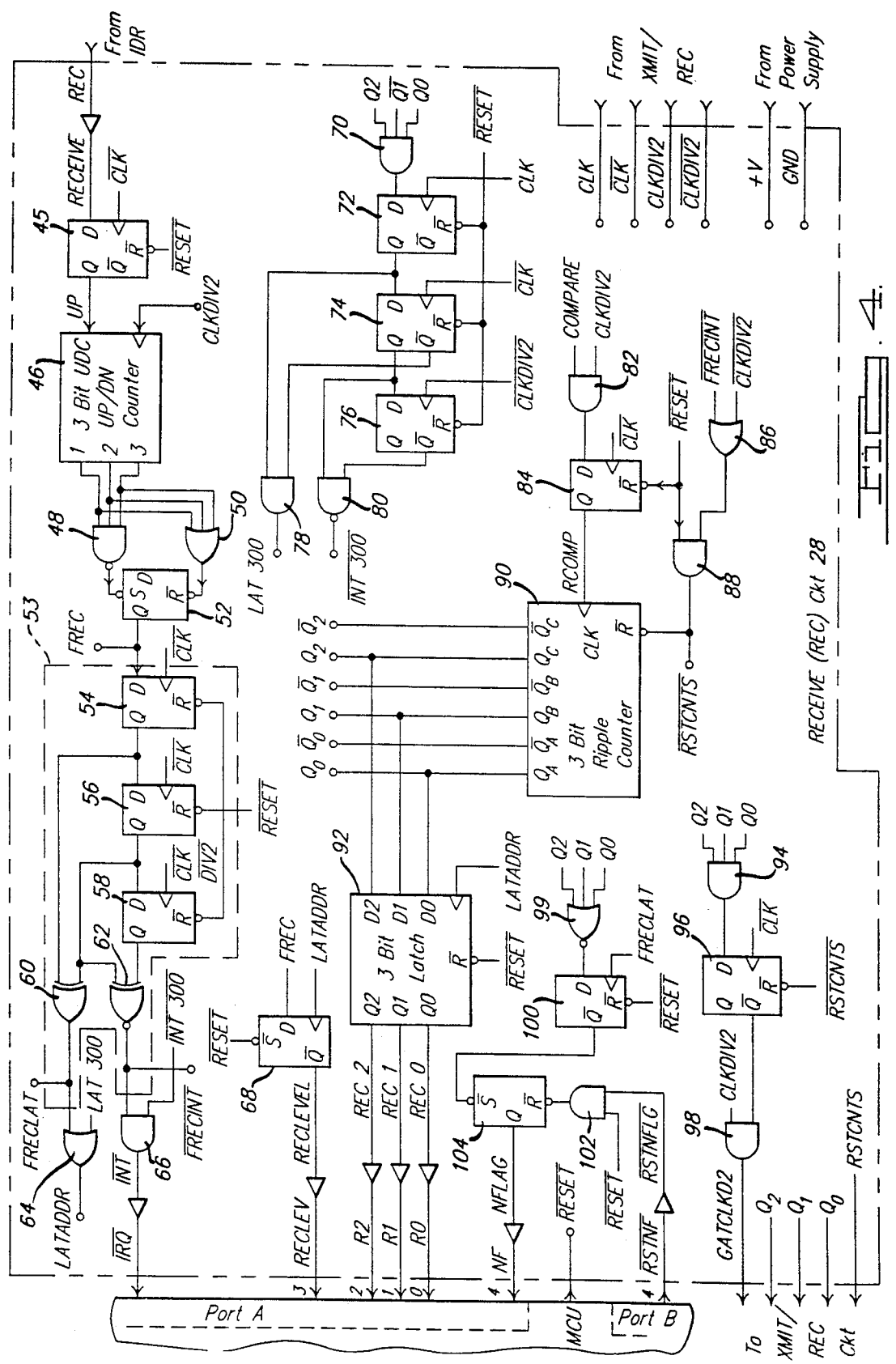

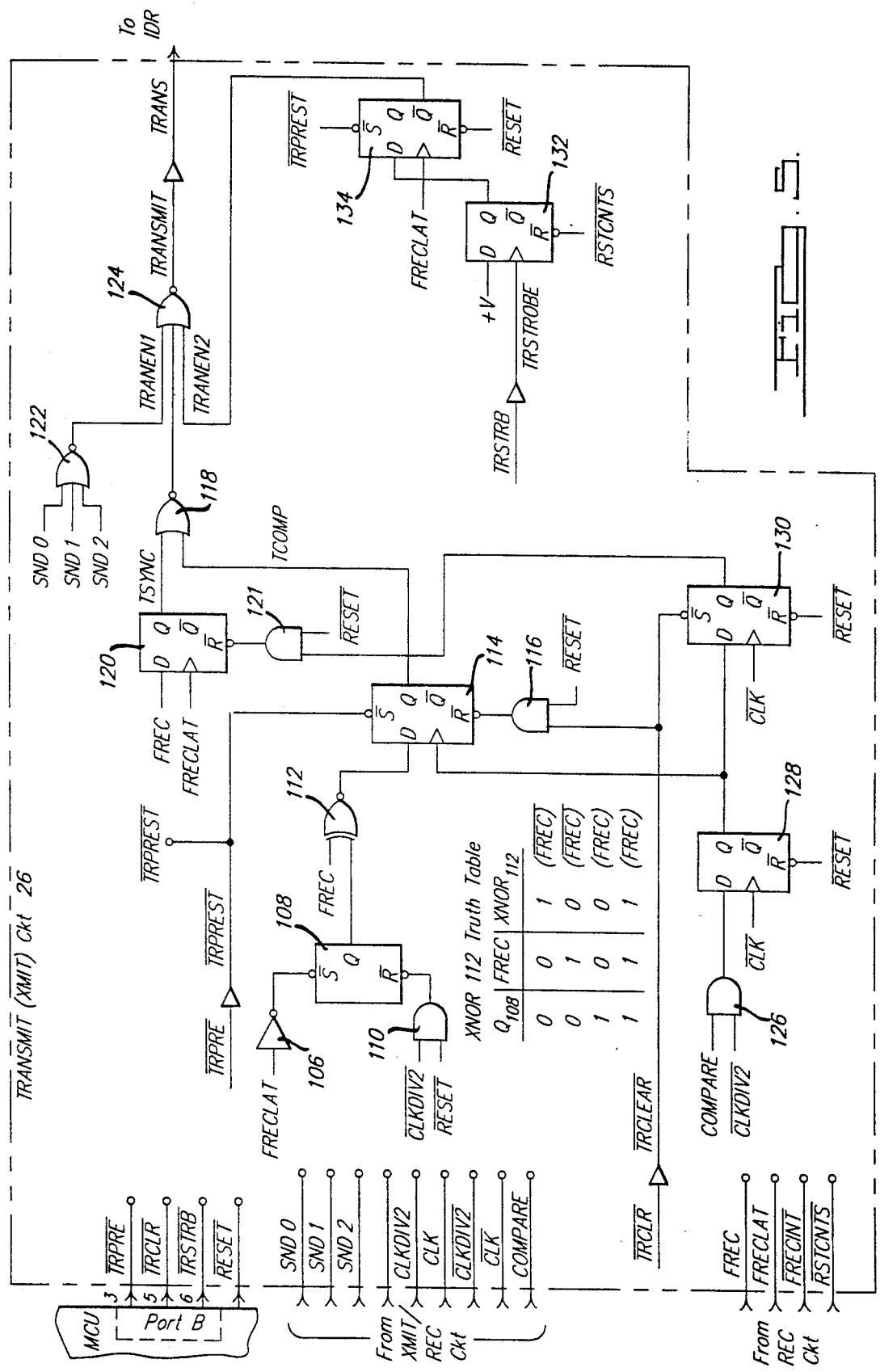

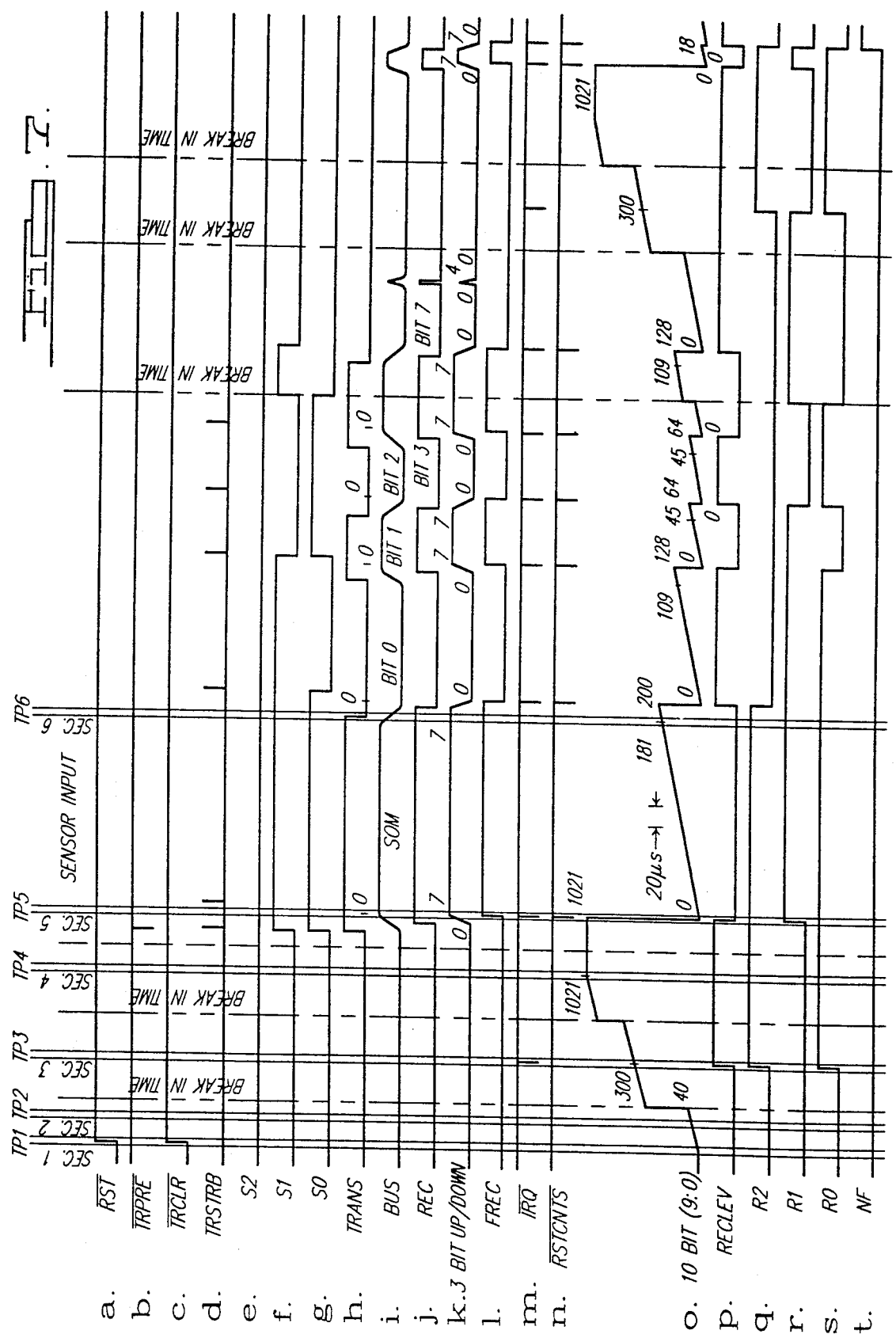

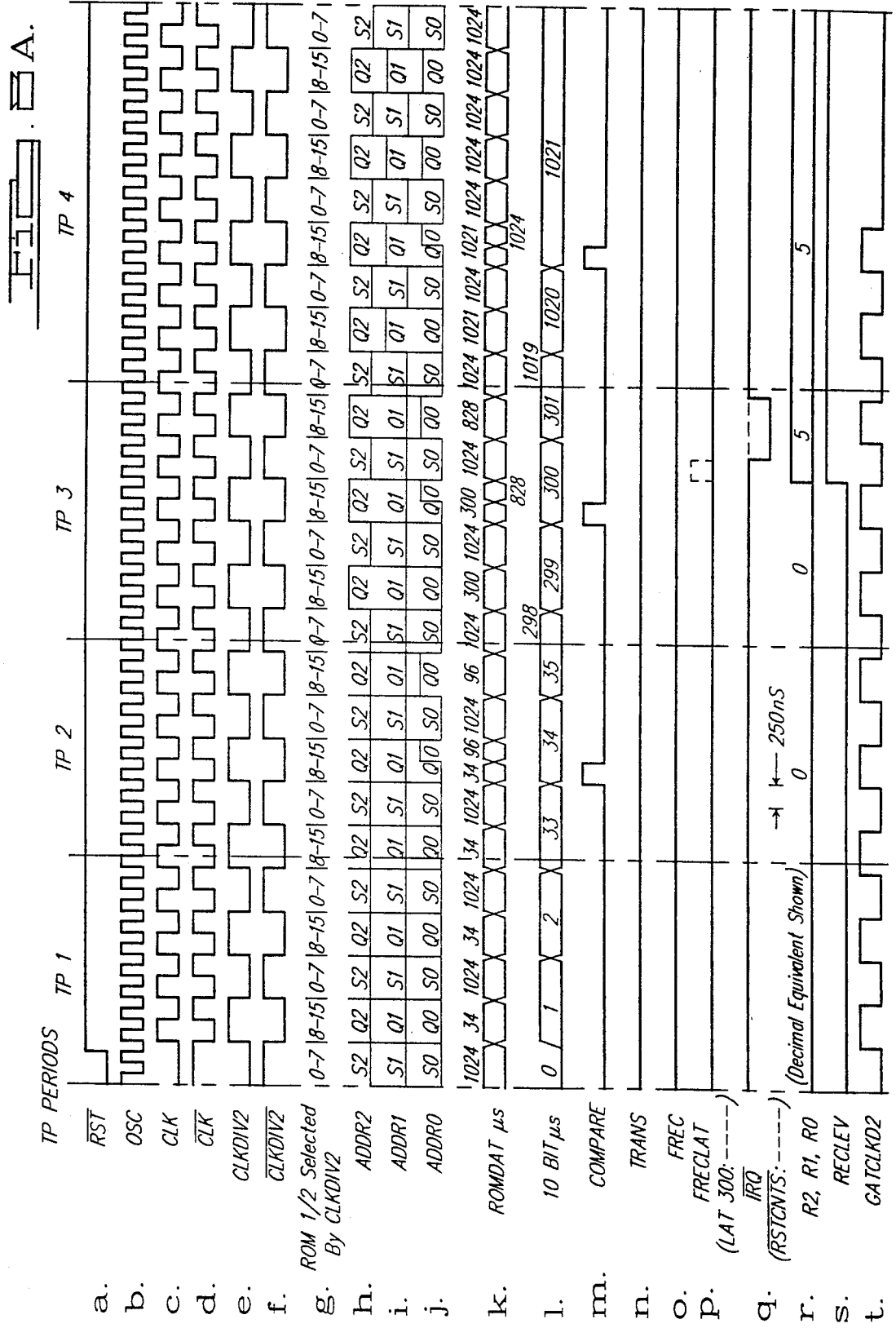

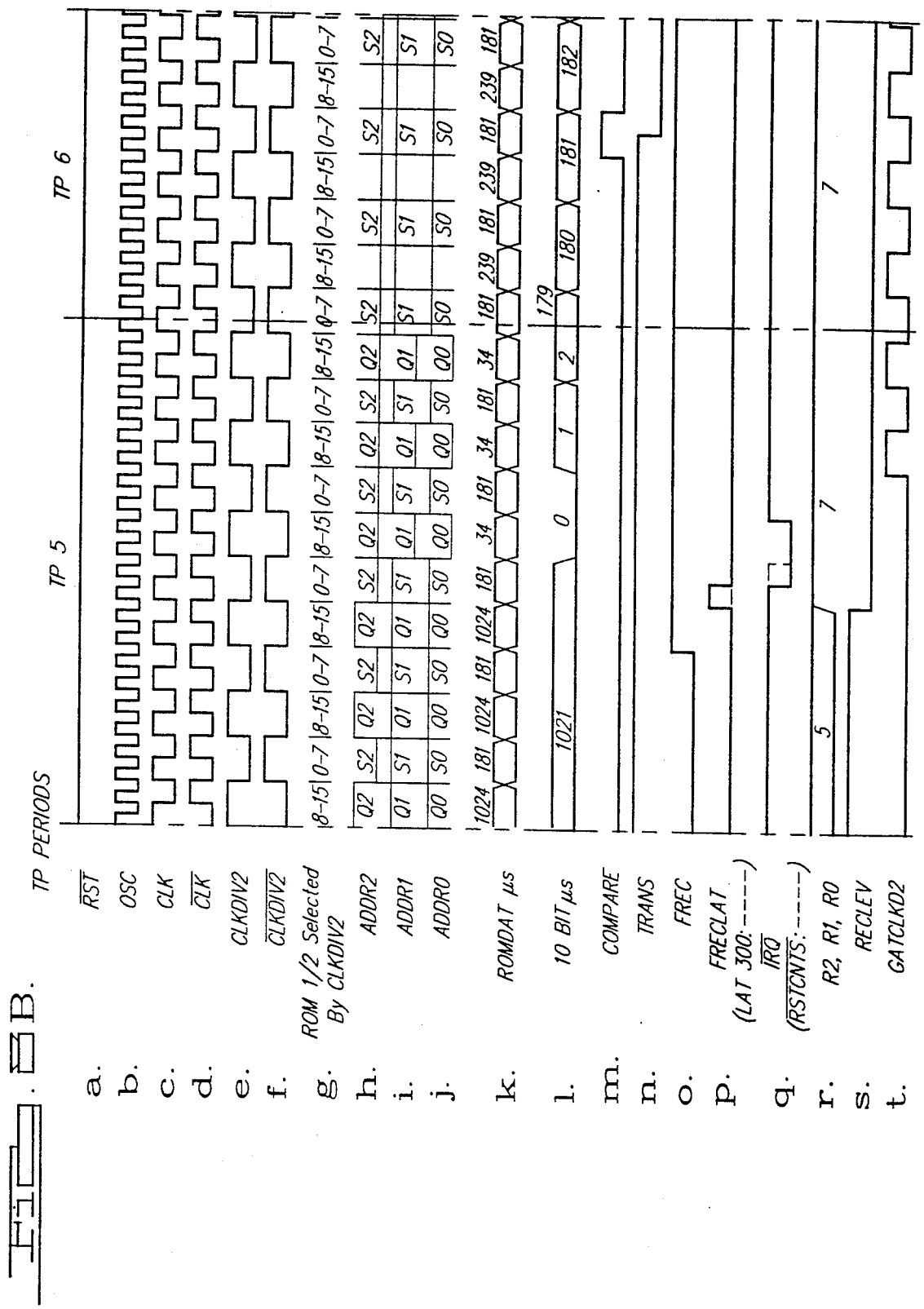

AUTOMATIC MULTIPLEX DATA LINK SYSTEM, SYMBOL ENCODER DECODER THEREFOR

BACKGROUND OF THE INVENTION

1. Field of the Invention

In the automobile industry, every year, more and more electronic devices find their way into vehicles. If the trend continues, by the end of the 1990s, the electronic content of vehicles will at least double.

The Society of Automotive Engineers (SAE) encourages the entire automotive industry to develop a standard data link, preferably a medium-speed (Class B) multiplexed data communications system. The SAE established Recommended Practice J1850 (a set of technical requirements and parameters) has already been accepted by the industry as the communications link.

2. Description of the Prior Art

When using software to generate puse codes that meet J1850 requirements and then to transmit code from a microcontroller (MCU) over a communications bus (bus) to a second MCU and then back over the bus to the first MCU, the transfers occurred too slow. A first try involved an inexpensive MCU which operated at about one-fourth the speed required.

To resolve the speed problem and cost, a combination of an MCU and a cooperating hardware circuit appeared to provide a likely combination for achieving the speed and cost sort for the task. Effort extended to seek such a combination resulted in the computer driven symbol encoder decoder (SED) of the present invention.

SUMMARY OF THE INVENTION

The present invention employs an inexpensive (MCU) for performing some of the tasks necessary to generate J1850 symbols. The hardware or SED chip, responsive to signals from both the MCU and an interface/driver/receiver (IDR) performs conversions of transmitted messages from the MCU into variable pulse width modulated (VPWM) line codings of J1850 symbols acceptable for processing by the IDR.

The IDR waveshapes the VPWM signals and drives the signal over the bus where listening nodes can receive it.

The IDR in the next node on the bus performs the same waveshaping and signal driving process as the first node when it is transmitting. Co-pending patent applications Ser. No. 07/982,321 of R. Hormel filed Nov. 27, 1992 entitled Vehicle Communications Network Transceiver, Bus Driver Therefor, Ser. No. 07/951,988 of R. Hormel et al. filed Sep. 28, 1992 entitled Vehicle Communications Network Transceiver, Transmitter Circuit Therefor and Ser. No. 07/951,989 of R. Hormel et al. filed Sep. 28, 1992 entitled Vehicle Communications Network Transcevier, Ground Translation Circuit Therefor provide teachings concerning the IDR.

BRIEF DESCRIPTION OF THE DRAWINGS

The invention and its mode of operation will be more fully understood from the following detailed description when taken with the apended drawing figures in which:

FIGS. 2A-2D depict the symbols used to form J1850 messages;

FIG. 3 illustrates in partial pictorial, partial block and logic diagram form the transmit/receiver circuit of the symbol encoder decoder;

FIG. 4 illustrates in partial block and logic diagram form the receive circuit of the symbol encoder decoder;

FIG. 6A depicts in flowchart form the foreground program used in the microcontroller of each node, for controlling the operation of the symbol encoder decoder;

FIGS. 6B-6G depict in flowchart form the background programs used to control the operation of the symbol encoder decoder;

FIGS. 7A-7T illustrate waveforms of input, output and some internal signals of the symbol encoder decoder over several time periods;

DETAILED DESCRIPTION OF A PREFERRED EMBODIMENT

Communications Network

Figure 1:
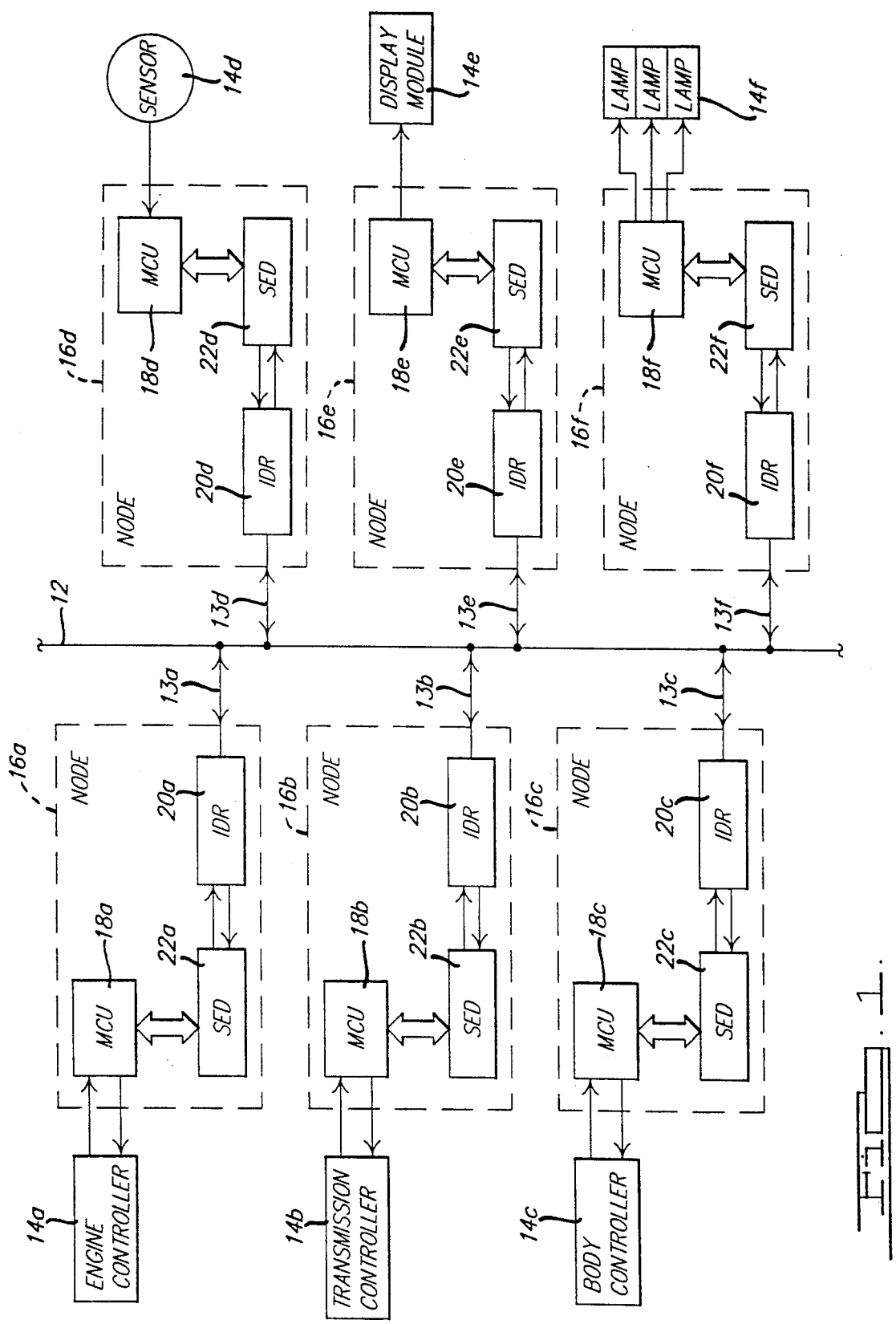
FIG. 1 illustrates in block diagram form a communications network, employing the symbol encoder decoder of this invention in each node of the network.

FIG. 1 depicts a block diagram of a communications network 10 with several nodes 16a-16f employing SED 22a-22f of this inventions coupled between a single-wire bus 12 and a plurality of sensors or application devices 14a-14f. Each of the SED 22a-22f couples between one of MCU 18a-18f and one of an IDR 20a-20f within each node 16a-16f, respectively. Each of the nodes 16a-16f connects to bus 12 via a stub 13a-13f, respectively.

Bus 12 routes near each node disposed throughout the vehicle supporting bi-directional transfer of a single data bit stream for various sensed or manually introduced applications.

Nodes 16a-16f, permit exchange of bit stream information under control of almost any established protocol.

THE NODES

Figure 2:
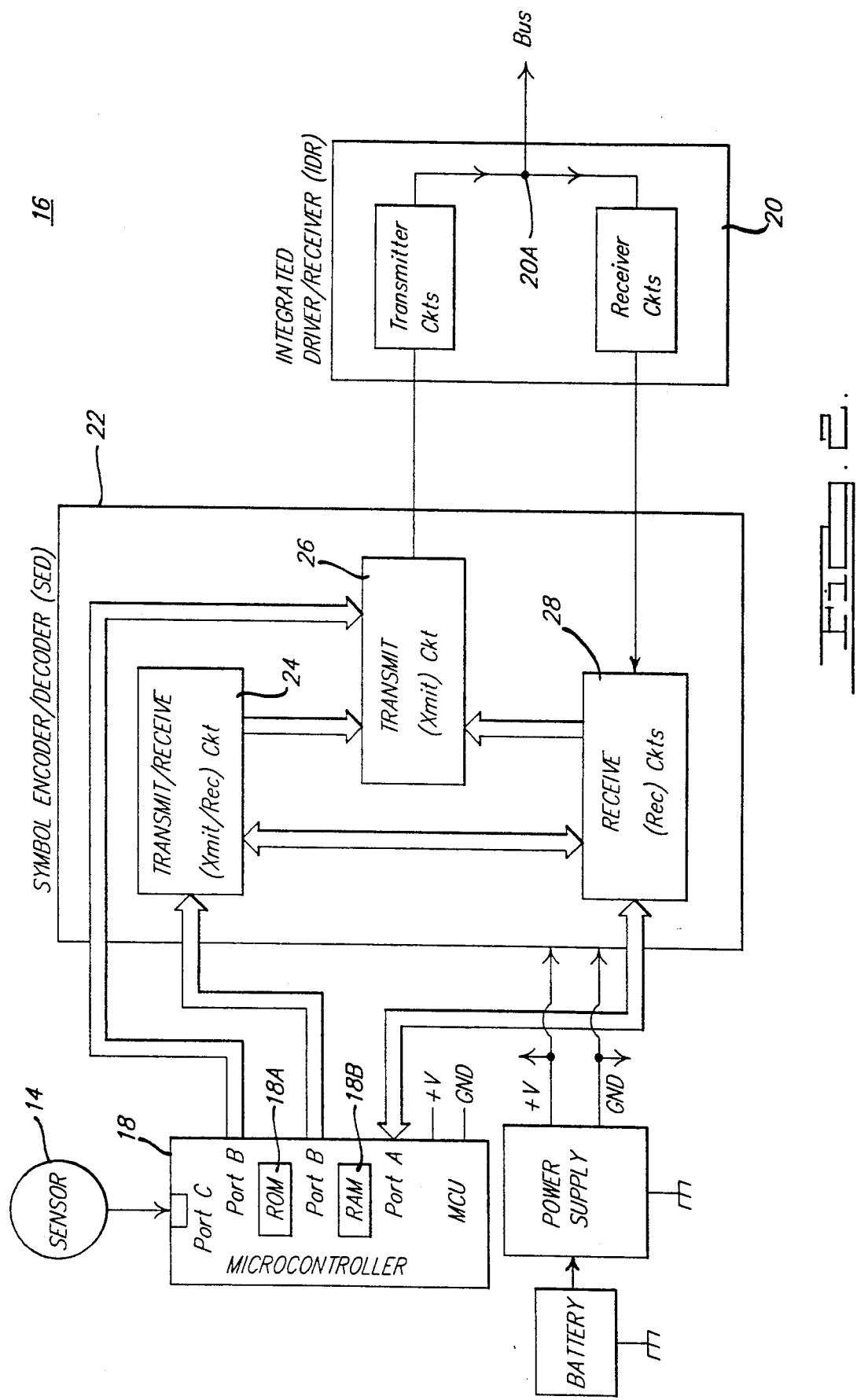
FIG. 2 depicts in block diagram form the components forming a node of the network.

With reference now to FIG. 2, another block diagram depicts additional details of a SED 22 and IDR 20 within node 16. Note that MCU 18 exchanges parallel data with SED 22 while SED 22 exchange serial data with ID 20.

MCU 18 instructs SED 22 to form messages, using various established J1850 symbols, as variable pulse width modulation (VPWM) bit streams. SED 22 relays these bit streams to IDR 20. IDR 20 massages the bit streams using waveshaping noise reduction techniques and unique line driving and grounding schemes before routing the messages over a non-twisted single wire bus 12 to other nodes 16 listening to messages placed on bus 12. Because of the aforementioned conditioning of the bit streams, bus 12 does not require shielded or unshielded twisted pairs of wire to keep radiated emissions down to acceptable levels.

MESSAGE PROTOCOL

After receiving impetus from a sensor or the like, MCU 18 of a sending node 16 generates a bus message containing extracted sensor data. Every node 16 reads the bus 12 at the same time (including the sending node).

Two or more nodes 16—16 may compete for control of the message, i.e., generate bus message nearly simultaneously. From a settlement of this competition, called arbitration, only one winner emerges. Arbitration, occurring on a symbol-by-symbol basis, originates at the falling edge of a start of a message (SOM) provided that at least one other node sends a SOM simultaneously. 1) A high level symbol dominates a low level symbol on the bus; 2) a short low level symbol dominates a long low level symbol; and 3) a long high level symbol dominates a short high. FIG. 2A distinguishes the symbols while FIG. 2D depicts arbitration of competing nodes, FIG. 2B illustrates an inter-byte separation (IBS) and FIG. 2C depicts a break (BRK) signal. The IBS, a two-part symbol, includes a standard short passive pulse followed by a dominant long high pulse explained supra. The BRK signal occurs during termination of bus communication and all nodes 16—16 reset to a "ready-to-receive" state.

The messages, formed on a symbol by symbol basis, appear much as depicted in FIG. 2A. Most symbols begin and end with a HIGH to LOW, or LOW to HIGH logic level transition. Every J1850 message begins with a Start ot Frame (SOF) or Start of Message (SOM) symbol (SOF=200 μs HIGH).

For actual data bytes, either a short LOW or a long HIGH (Short=64 μs, Long=128 μs) represents a logical 0 bit; while, either a long LOW or a short HIGH represents a logical 1 bit.

A two-part delimiter symbol FIG. 2B), which may be transmitted between any two bytes, consisting of a short LOW (34-96 μs) followed by a HIGH period of 280-768 μs represents an Inter-Byte Separation (IBS) symbol.

The End of Data (EOD) of FIG. 2A, another delimiter symbol (EOD=200 μs LOW) goes at the end of a message and represents the period after which other nodes can transmit optional in-frame response bytes.

End of Frame (EOF) of End of Message (EOM) delimiter symbol of FIG. 2A (EOF=280 microseconds LOW) comes at the end of a complete transmission over the bus, including the message and any response (RSP) byte(s).

After an Inter-frame separation (IFS) or inter-message separation (IMS) delimiter symbol (IFS=300 microseconds LOW) any node can freely transmit a new message on to bus 12.

Other data and delimiter symbols exist, but it is believed that the above acts as a representative group.

After accepting sensed data from a sensor 14 of FIG. 2, message initiation-takes place in MCU 18. MCU 18 then instructs the SED 22 to begin transmitting. SED 22 includes three interrelated circuits, namely a transmit/-receive circuit (XMIT/REC CKT) 24, transmit circuit (XMIT CKT) 26 and a receive circuit (REC CKT) 28.

Initialized circuits and components in MCU 18 and SED 22 start a system clock generation function in the XMIT/REC circuit 24 of SED 22. After a leading edge of an initial bit of the pulse stream routes to 20, a delayed leading edge of the initial bit reflects back to SED 22 via a junction point 20A within IDR 20. This reflected leading edge returns to SED 22 to become the SEDs internal reference signal used to indicate the beginning of a symbol (usually the first symbol transmitted is a SOM).

Transmit/Receive (XMIT/REC) CKT

Referring now to FIG. 3, this schematic diagram illustrates sequential and combinational logic circuits of XMIT/REC ckt 24 of SED chip 22.

/RST Signal

During initial operations of generating symbols used to form messages in VPWM coding, XMIT/REC ckt 24 receives a low RESET (/RST) and an oscillating (OSC) signal from MCU 18. (Note, the back slash (/) means the signal is asserted when at a logical zero or LOW level. It also represents the inverse of a signal.) A LOW/RST signal issues to reset all sequential logic circuits in XMIT/REC ckt 24 and most of the sequential logic circuits in the XMIT and REC circuits 26 and 28, respectively, in response to a reset signal from MCU 18.

The OSC Signal

The OSC signal, also from MCU 18, provides a source of continuous and accurate clock signals used for clocking system operations. Frequencies of 4 or 8 MHz respond suitably for this use. The OSC signal routes to a clock generator (CLK GEN) circuit 30 containing a 2-bit ripple counter 32 which divides the OSC signal into two (2) slower clock signals, OSCDIV2 and OSCDIV4.

The CLK Signal

OSCDIV2 and OSCDIV4 route to a 2 to 1 multiplexer (MUX) circuit 34, formed from AND-OR gate combinational logic. MUX 34 extracts from the two pulse trains a first clock signal (CLK) of a chosen frequency, e.g., 2 MHz and the inverse clock signal (/CLK) via inverter 37.

The CLKDIV2 Signal

A sequential logic divide by two (2) circuit 36 receives the CLK signal at an input terminal and produces at an output terminal a second clock signal (CLKDIV2) half the frequency of the CLK signal, e.g., 1 MHz. A conventional inverter 39 provides an inverse pulse CLKDIV2. Both the CLK and CLKDIV2 signals and sometimes their inverse pulses route to various sequential logic circuits of the SED chip 22.

The 4 to 10 ADDRESSABLE DECODER ROM

XMIT/REC ckt 24 also contains a 4 to 10 addressable decoder ROM circuit 40 for storing 16 different, 10 bit data words representative of the J1850 symbols used to form J1850 messages for communicating over bus 12. This ROM decoder ROM 40 is constructed using combination logic (not shown). Each individual 10-bit data word is selected by a 4-bit address. The 4-bit address bus is made up of signals CLKDIV2, ADDR2, ADDR1, and ADDR0 where CLKDIV2 is the most significant bit of the address.

SEND AND RECEIVE CODES

Send codes S2, S1 and S0) sent over to SED 22 of FIG. 2 from MCU 18, port B, combine with /CLKDIV2=LOW to form eight 4-bit addresses. Each of these addresses select 1 of eight 10-bit transmit words stored in ROM decoder ROM 40. These 10-bit words represent symbol lengths used by SED 22 to transmit J1850 VPWM messages on the bus (via IDR 20).

Receive codes (Q2, Q1 and Q0) from REC CKT 28 combine with /CLKDIV2=HIGH to form another group of eight 4-bit addresses. Each of these addresses select 1 of eight 10-bit receive words stored in the ROM. These 10-bit words represent symbol lengths of time used by the SED t identify which symbol it is receiving from the bus (via the IDR).

6 TO 3 ROM ADDRESS MUX

A combinational logic, 6 to 3 ROM address MUX 38 of FIG. 3, permits selecting either the three (3) send codes (S0-S2) or the three (3) receive codes (Q0-Q2) used as a three bit address (ADDR2, ADDR1, ADDR0) for addressing decoder ROM40. The level of the CLKDIV2 signal determines whether a receive or send address code is selected.

10-BIT COUNTER

Free running, 10-bit counter 42, also located in the XMIT/REC ckt, increments every 1 μs, halts when the count reaches 1021 μs and resets on every transition the SED chip receives at its receive pin of REC ckt 28 (FIG. 4).

This counter measures the length of time between bus signal transitions (the length of each symbol). A conventional 10-bit ripple counter would also work in this application.

10-Bit Comparator

When REC ckt 28 receives a bus signal transition, 10-bit counter 42 of FIG. 3 resets and starts a new count. A receive ROM address counter 90 of FIG. 4 in the REC ckt 28 (to be discussed infra) also resets. The first value in the receive half of decoder ROM 40 of FIG. 3, a 34 μs (minimum short symbol) signal exits decoder ROM 40 as a 10-bit data word on the 10 ROM-DAT pins. Values in the ROM and the 10-bit counter are compared in a 10-bit combinational logic comparator 44 to each other on every count of the 10-bit counter (every 1.0 μs). If the 10-bit counter 42 reaches a count of 34 before another bus signal transition occurs (which would cause a reset of the counter), the two values will compare as equal to each other. This would cause the receive ROM address counter 90 (in the REC CKT 28 of FIG. 4) to increment.

The receive counter 90 now considers addresses having a data value of 96 microseconds (min long). If the 10-bit counter 40 of FIG. 3 reaches a count of 96 before another bus transition occurs, the receive ROM value and the 10-bit counter value will again compare in comparator 44.

The receive counter 90 of FIG. 4 again increments resulting in a receive ROM value of 163 μs (min SOF/EOD) being addressed.

When the next bus transition is received, the value of the receive counter 90 is latched via 3 bit latch 92 to REC ckt 28 output pins R2,R1 & R0 and the previous bus level (the level of the symbol just received) is also latched to another REC ckt 28 output pin, called RECLEV.

MCU 18 of FIG. 2 can now decode this data to determine what bus symbol was received by SED chip 22.

RECEIVE (REC) CKT

Filtering the Receive Signal

FIG. 4 depicts the combination and sequential logic circuits of the REC Ckt 28. Some of the circuits of REC CKT 28 have been mentioned in connection with generation of symbols. Note, also, the flow of signals go from the IDR toward MCU18. REC ckt 28 processes analog signals from IDR 20 and converts it to digital signals.

As mentioned previously, a REC Ckt input pin (REC) of this circuit accepts pulse trains (J1850 messages) from IDR 20. The REC signal routes to a D-flip flop(D-FF) 45 which transfers the signal to a Q-output pin in response to a rising edge of the 0.5 μs /CLK signal from XMIT/REC of FIG. 3. D-FF 45 synchronizes the incoming REC signal to the clock signals in SED 22.

3Bit Up/Down Counter

The REC signal enters a unique 3-bit UP/DOWN counter (UDC) 46 having a count sequence of 0, 1, 3, 2, 6, 4, 5, and 7. Using this sequence only, the 0-7 counts have an affect, the intermediate counts do not. The counter increments in response to a rising edge of the 1.0 μs CLKDIV2 signal. UDC 46 counts UP in response to a HIGH-REC signal and DOWN to a LOW-REC signal.

The binary count in UDC 46, outputs to input pins of a selector circuit consisting of NAND gate 48, OR gate 50 and D-FF 52. Complementary output signals from gate 48 and OR gate 50 asserts inverted set and reset signals to dedicated set and reset pins of D-FF 52. A LOW set input signal latches a HIGH filtered received (FREC) signal at the output terminal of D-FF 52, and a LOW reset signal latches a LOW FREC signal. When the count in UDC 46 reaches 7, the FREC signal latches HIGH and when it goes to zero (0), FREC latches LOW. Intermediate counts in UDC 46 have no affect on the FREC signal. UDC 46 holds at the end points (i.e., if the count is 7), the counter stays at 7 until the REC signal goes LOW).

FRECLAT and /FRECINT Pulse Generation

The FREC signal from the Q output of D-FF 52 routes to a filtered receive latch (FRECLAT) and interrupt (FRECINT) known, three-stage, shift-register circuit comprised of a well-known, three-stage, shift-register circuit comprised of a first D-FF 54 clocked by the 2 MHz CLK signal, a second D-FF 56 clocked by its inverse, the /CLK signal, and a third D-FF 58 clocked by the 1 MHz /CLKDIV2 signal.

The output of D-FF's 54 and 56 go to the input of an exclusive OR gate 60 (XOR), while the output of D-FF 56 and 58 go to the input of an exclusive NOR gate 62 [XNOR).

XOR 60 and XNOR 62 output terminals provide the FRECLAT and /FRECINT signals.

The /FRECINT-FRECLAT circuit 53 responds to both HIGH to LOW and LOW to HIGH transitions of the FREC signal. The FRECLAT pulse generates in response to the HIGH to LOW transition.

Illustratively, consider circuit 53 receiving a HIGH to LOW transition of the FREC signal. At a time T-1 before the receipt of a CLK signal, while FREC is still HIGH, the output signal FRECLAT from XOR 60 is LOW, while /FRECINT from XNOR 62 is HIGH. The Q outputs of D-FF's 54, 56 and 58 are all HIGH at this time.

At time T=0, the LOW at the FREC pin is transferred to the Q of D-FF 54 in response to a rising edge of the CLK signal. XOR 60 now has a HIGH on one input and a low on the other. In response to these inputs, the output of XOR 60 (FRECLAT) goes HIGH, creating the leading edge of a FRECLAT pulse. The output of XNOR 62 remains the same.

At time T+1, the FREC signal remaining LOW and on Q54 (Q54 means the Q output of D-FF 54) is now transferred to the Q pin of D-FF 56 in response to a rising edge of the /CLK signal. XOR 60 once again has the same logic level on both its inputs. It, therefore, goes LOW, ending the FRECLAT pulse. XNOR 62 now has a HIGH from Q58 on one input, and the LOW from Q54 on the other. These inputs cause the output of XNOR 62 to go LOW, creating the leading edge of a /FRECINT pulse.

At the time T+2, the LOW that is now on Q56 is transferred to the Q of D-FF 58 in response to a rising edge on the /CLKDIV2 signal. XNOR 62, once again, has the same logic level on both its inputs. It, therefore, goes HIGH, ending the /FRECINT pulse.

Both of these pulses indicate that FREC has changed state, and are used by various SED 22 circuits as well as by the MCU 18 (in the form of the /IRQ signal).

LATADDR & /IRQ

The FRECLAT signal leaves the /FRECINT-FRECLAT ckt 53 and routes to OR gate 64. Here it is ORed with a LAT300 signal, explained infra, to create the latch address (LATADDR) signal used within REC CKT 28 and TRANS CKT 26.

The /FRECINT signal also leaves ckt 53 and routes to AND gate 66. Here it is ORed with a /INT300 signal, explained infra, to create the interrupt request (/IRQ) signal, which is used to initiate an interrupt in MCU 18.

RECEIVE LEVEL

The LATADRR signal clocks the FREC signal through D-FF 68 to produce a receive level signal (RECLEV). Since FREC has just changed state prior to the arrival of the LATADDR signal, the level of the signal at the IQ output of D-FF 68 indicates the previous FREC level. MCU 18 uses RECLEV in conjunction with the REC pins R2, R1, and R0 to identify which J1850 symbol was just received by the SED 22.

RECEIVE ROM ADDRESS COUNTER CIRCUIT

The receive ROM address counter circuit 90 of the REC CKT 28 provides the Q2,Q1 & Q0 signals and the complementary signals used as address codes for selecting the receive symbol 10-bit words in the lower half of the decoder ROM 40 of FIG. 3. When the value of the 10-bit word compares with the count from the 10-bit counter 42, the COMPARE signal from comparator 44 goes HIGH, and the 3-bit ripple counter 90 of FIG. 4 used to generate Q2, Q1, & Q0 signal increments.

The receive compare (RCOMP) signal from the output of D-FF 84 clocks (or increments) counter 90. The COMPARE signal is anded with the CLKDIV2 signal in AND gate 82. This ensures that only comparisons associated with the receive portion of ROM 40 of FIG. 3 will cause counter 90 of FIG. 4 to increment. The CLKDIV2 signal performs a enabling function in conjunction with the COMPARE signal at AND GATE 82. CLKDIV2 also serves as one of the bits of the addresses for decoder ROM 40 of FIG. 3. When CLKDIV2 goes HIGH, one of the eight 10-bit words in ROM 40 used when receiving pulse trains from IDR 20 is selected. The occurrence of a HIGH COMPARE signal at the same time of a HIGH CLKDIV2 means the value of the 10-bit counter 42 of FIG. 3 equals the selected receive ROM value. This is referred to as a receive compare (RCOMP) is a HIGH signal. When COMPARE and CLKDIV2 signals are both HIGH, the output of AND gate 82 of FIG. 4 goes HIGH. This HIGH signal is clocked into D-FF 84 by a rising edge of the /CLK signal, causing the output of D-FF 84 RCOMP) to go HIGH. This rising edge of RCOMP increments counter 90.

GENERATION OF RECEIVE SIGNALS R2,R1 & R0

Counter 90 outputs Q2,Q1 & Q0 and their complements. The three Q signals route to the input of a 3 BIT LATCH 92. The value of counter 90 (Q2, Q1 and Q0) is latched out to output pins R2, R1 and R0 in response to the occurrence of a LATADDR pulse. Latch 92 resets in response to a LOW /RESET signal.

300 µs Interrupt and Latch Generator for INT300 and LAT 300 Signals

When FREC has been a HIGH or a LOW for a duration of 300 µs, a receive COMPARE occurs. 300 µs is a receive ROM 40 of FIG. 3 value, stored at address 1100. After the receive compare counter 90 of FIG. 4 has incremented, the ROM 40 address becomes 1101. This oauses the output of AND GATE 70 of FIG. 4 to go HIGH. D-FFs 72, 74 and 76 form a shift register similar to D-FFs 54, 56 and 58 of the /FRECINT-FRECLAT CKT 53.

At time T−1, before the 300 µs receive COMPARE occurs, the output of D-FFs 72, 74 and 76 are all at LOW levels. AND gate 78 and NAND 80 both have one input HIGH and one input LOW. This causes a LOW LAT 300 signal and a HIGH /INT 300 signal.

At time T=0, a rising CLK edge clocks the HIGH signal of AND gate 70 through to Q72. AND gate 78 now has both inputs HIGH, so its output (LAT300) goes HIGH.

At time T+1, a rising /CLK edge clocks the HIGH signal at Q72 through to Q74. This causes a LOW on /Q74. NAND 80 now has both inputs HIGH, so its output (/INT300) goes LOW. AND gate 78 receives a HIGH from Q72 and a LOW from /Q74, so its output (LAT300) returns to a LOW. This ends the LAT 300 pulse.

At time T+2, a rising /CLKDIV2 edge clocks the HIGH on Q74 into D-FF 76. This causes /Q76 to go LOW. NAND 80 now receives a HIGH from Q74 and a LOW from /Q76 and its output (/INT300) returns HIGH. This is the end of the /INT300 pulse.

Both of these pulses indicate that FREC has been at the same level for 300 µs, and are used by various SED22 circuits as well as by the MCU 18 (in the form of the /IRQ signal).

The Generatio of the Gated Clock Divide 2 (GATCLKD2) Signal

The GATCLKD2 signal halts the 10-bit counter 42 of FIG. 3 if FREC has been at a HIGH or a LOW level for a time period equal to or greater than 1021 µs long. A value of 111 from counter 90 of FIG. 4 indicates that a 1021 us or greater symbol has been received.

HIGH Q2, Q1 & Q0 signals route to AND gate 94 where a HIGH/CLK signal causes D-FF 96 to transfer a LOW from /Q96 to an input of AND gate 98. This causes the output of AND 98 (GATCLKD2) to remain LOW. A LOW GATCLKD2 signal suspends the clocking of the 10-BIT COUNTER 42 of FIG. 3. Upon receipt of a LOW /RSTCNTS pulse from AND gate 88 caused by a LOW /RESET input signal to gate 88 or a LOW /FRECINT or LOW/CLKDIV2. signal to gate 86, GATCLKD2 will again provide a clock signal to 10-BIT COUNTER 42.

The Noise Flag Circuit

Having Q2, Q1 & Q0 signals LOW, indicates entry of an illegally short symbol on the REC line to REC CKT 28 of FIG. 4. An illegal short symbol is defined as FREC remaining at the same level (HIGH or LOW) for 34 µs or less. The FRECLAT signal latches the HIGH output of NOR gate 99 into D-FF 100. This causes /Q100 to go LOW, which sets Q104 of D-FF 104.

The Q output of D-FF 104 produces a NOISE FLAG (NF) signal that routes to MCU 18. This lets the MCU 18 know there was an illegal short on the bus.

A LOW not reset noise flag (/RSTCNTS) signal or a LOW/RESET signal, via AND 102, will reset D-FF 104 and cause the NF signal to go LOW.

TRANSMITION CIRCUIT (XMIT CKT)

Loss of Arbitration

Two or more nodes 16 of FIG. 1 can transmit on bus 12 simultaneously. When an MCU 18 receives a symbol from its SED22 other than the symbol it was attempting to transmit, it must cease transmitting. This is called loss of arbitration.

Transmit

MCU 18 uses SED 22 to transmit symbols on the bus. MCU 18 must do two things to cause SED 22 to start transmitting the first symbol to IDR 20 and out ont bus. First, the /TRPRE (TRANSMIT PRESET) pin is pulsed LOW; this presets D-FF 114 causing the TCOMP signal to go HIGH. This HIGH will propagate through NOR gates 118 and 124 and out to the TRANS pin if the two TRANEN inputs to NOR 124 are LOW. A LOW TRPRE also presets D-FF 134 causing TRANEN2 to go LOW.

Secondly, MCU 18 must write the send code on the S2, S1, and S0 pins (SND2, SND1, SND0 signals) of the symbol it wants to transmit. Any value other than 000 will cause NOR 122 to output a LOW on TRANEN1. The value on the S2, S1, and S0 pins is also used by the ROM address MUX 38 of FIG. 3 of the XMIT/REC CKT 24 to address one of the 8 transmit decoder ROM 40 values.

The values stored in the transmit portion of ROM 40 represent nominal lengths of time for the various J1850 symbols, minus 19 µs. 19 µs must be subtracted from each value for the following reason. It takes about 19 µs for SED 22 to receive back from IDR 20 the leading edge of the symbol it is transmitting. SED 22 uses this point in time when its FREC signal in FIG. 4 changes state as T=0 for measuring how long to transmit a particular symbol.

The transmit decoder ROM 40 of FIG. 3 value is used to transmit a symbol in the following manner. At T=0, when FREC changes state, the 10-bit counter 42 is reset. The selected transmit decoder ROM 40 value is compared to the count in 10-bit counter 42 on every count of the 10-bit counter. When compare occurs, the TRANS pin of FIG. 5 value will toggle in the manner mentioned below. The resulting symbol on BUS 12 will be the selected J1850 symbol of the appropriate length of time.

Transmit Compare Operation

Note that the transmit signal coming out of AND 124, if enabled by TRANEN1 and TRANEN2, results from ORing transmit synchronization (TSYNC) and transmit compare (TCOMP) signals TRANEN1 is the output of NOR 122; if either of SND2, SND1, or SND0 is HIGH, TRANEN1 is a LOW. This provides one of the necessary enable inputs to NOR 124. The other enable input is the TRANEN2 signal, which will be described with the transtrobe circuit below.

D-FF's 108, 114, and 128 work together to drive the TCOMP signal. When a transmit COMPARE signal occurs in a transmitting node (10 bit counter 42 of FIG. 3 equals the selected transmit decoder ROM 40 value). It is desirable that the counter 42 equals to the opposite level (i.e. toggle), to start the next symbol. This normally occurs in the following manner. A transmit compare is defined by COMPARE and /CLKDIV2 both being high. This causes AND 126 of FIG. 5 to output a HIGH. This HIGH is clocked out to Q128 by a HIGH to LOW /CLK transition. The HIGH to LOW transition of Q128 becomes the clock signal for D-FF 114. When D-FF 114 is clocked, Q114 (TCOMP) takes on the value of XNOR 112. The two inputs to XNOR 112 are Q108 and FREC. The purpose of Q108 is to act as an inverting/non-inverting input to XNOR 112. If Q108 is LOW, the output of XNOR 112 is equal to the value of FREC Normally, Q108 will be LOW, and D-FF 114 latches the inverse of FREC to TCOMP line. This causes the TRANS pin to toggle (see XNOR 112 truth table).

There exists a window between the time where FREC changes and the 10-bit counter 42 of FIG. 3 resets. A transmit compare can occur in this window. If it occurs, D-FF 114 needs to latch the value of FREC, rather than its inverse, TCOMP. This will cause the TCOMP signal to correctly toggle. The FRECLAT pulse that is generated in conjunction with a change of FREC causes D-FF 108 to set. This causes a HIGH Q108, which causes the output of XNOR 112 to equal the same level as FREC. After this window period is over, /CLKDIV2 going LOW resets D-FF 108, and Q108 is once again LOW.

TRANS PIN PHASE SYNCHRONIZATION

When two nodes are transmitting on the bus, one node may cause a transition before a second node has a change to cause a transition. If this transltion is received by the second node before it reaches transmit compare, the transmit compare will not occur. This is because the 10-bit counter 42 of FIG. 3 is reset shortly after the transition on FREC (/RSTCNTS resets the 10-bit counter 42). In order for your TRANS pin of FIG. 5 to stay in phase with the current bus level, D-FF 120 is clocked to the level of FREC by the FRECLAT pulse.

D-FF 128 clocks to a HIGH following a receive compare as described above. This HIGH is clocked into D-FF 130, causing /Q130 to go LOW. This resets D-FF 120 via AND gate 121. This action allows the TCOMP signal to drive the trans pin.

TRANSTROBE CIRCUIT

The transtrobe circuit provides one of the two enable signals to NOR 124 (TRANEN2 equals a LOW). A transtrobe pulse is required from MCU 18 for every symbol it transmits. If it fails to provide these pulses due to a MCU 18 malfunction, the trans pln of SED 22 is disabled by TRANEN2 going HIGH.

A LOW to HIGH transition on the TRSTRB pin clocks a HIGH into D-FF 132. When a FREC transition occurs, a FRECLAT pulse clocks the HIGH into D-FF 134 causing TRANEN2 to be LOW. The FRECLAT pulse is followed by the not reset counters /RSTCNTS signal going LOW, esetting D-FF 132. Another TRSTRB pulse is required from MCU 18 before FREC again changes state, or the FRECLAT pulse will clock a HIGH out to /Q134. TRANEN2 going HIGH will disable NOR 124 and the TRANS pin.

When FREC signal changes, a FRECLAT pulse generates 250 ns later. The rising edge of the FRECLAT pulse clocks the FREC signal through D-FF 120 to produce the transmit sync (TSYNC) signal and thus out to the TRANS pin (if the TRANS pin is enabled). When a TRANS COMPARE occurs, D-FF 120 RESETS in response to the signal from D-FF 130/Q. In this way, the TSYNC signal is disabled and TCOMP takes over driving the TRANS pin.

Timing Diagrams

Figure 8A:
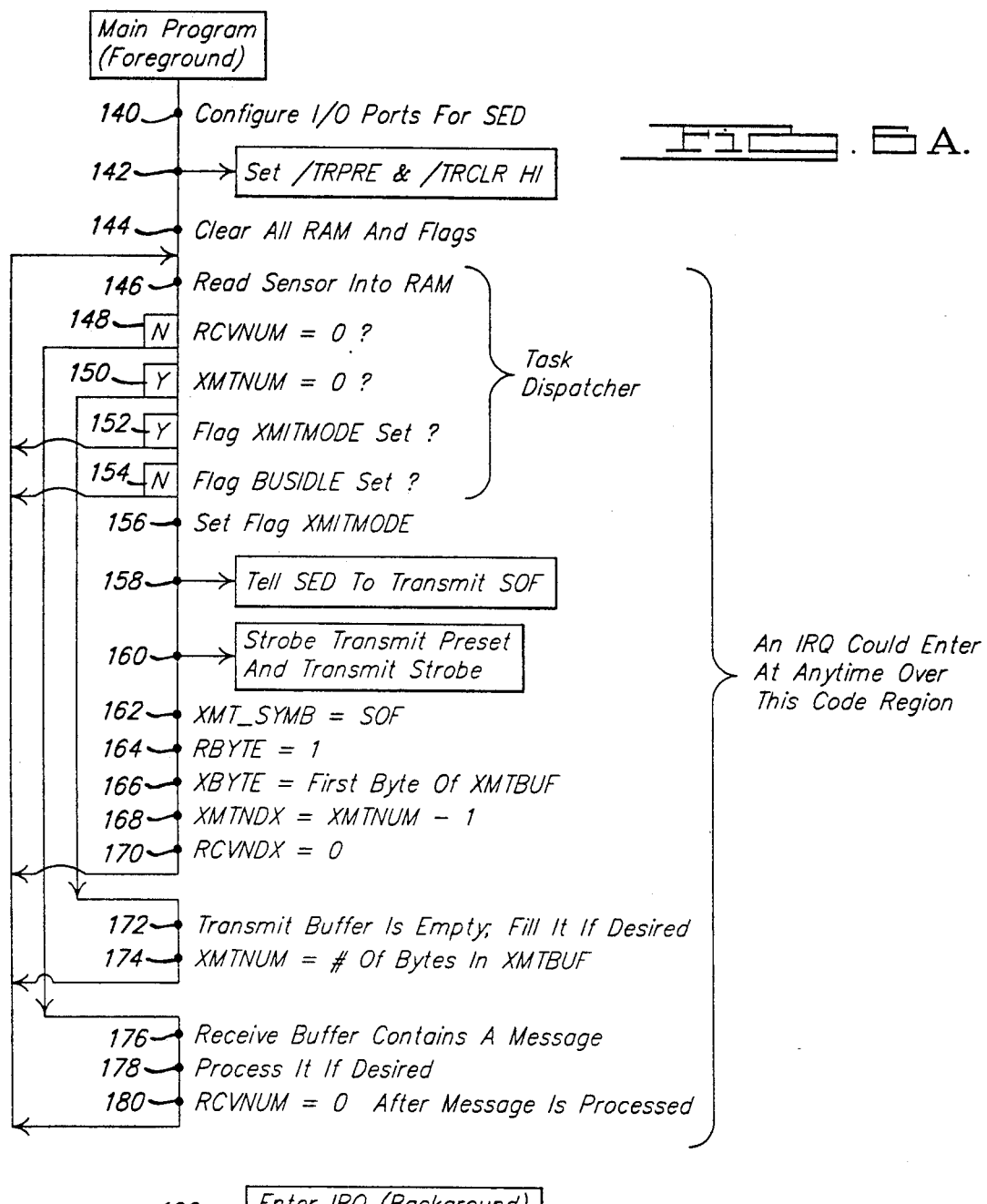
FIGS. 8A-8B illustrate the symbol encoder decoder waveform at a higher resolution time scale.
Figure 8B:
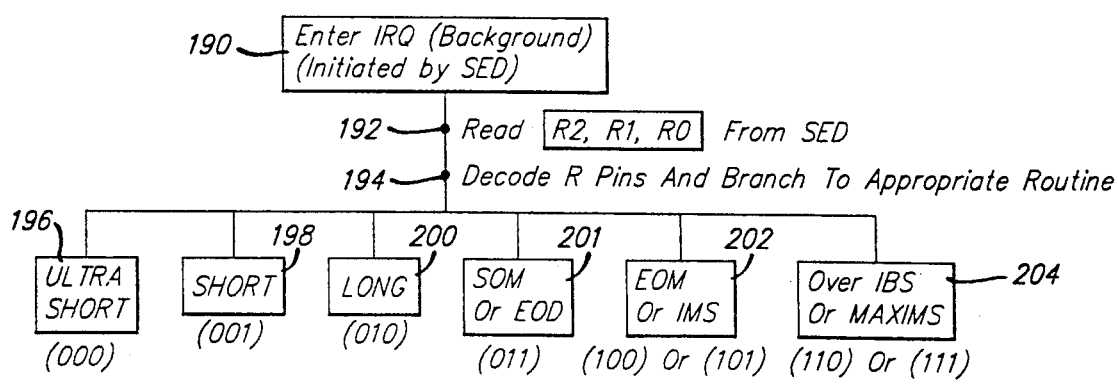
Figure 5C:
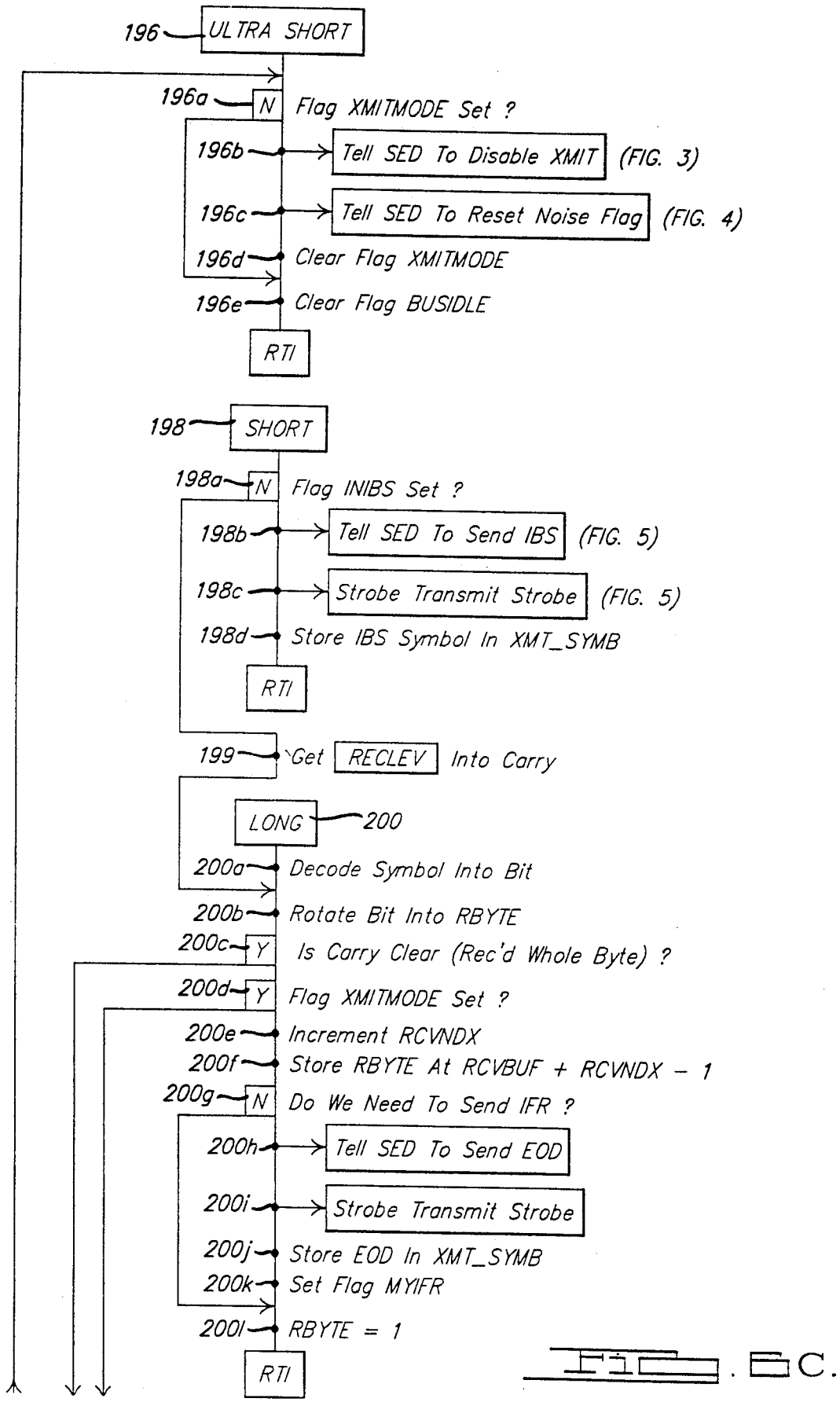
FIG. 5 illustrates in logic diagram form the transmit circuit of the symbol encoder decoder.
Figure 5D:
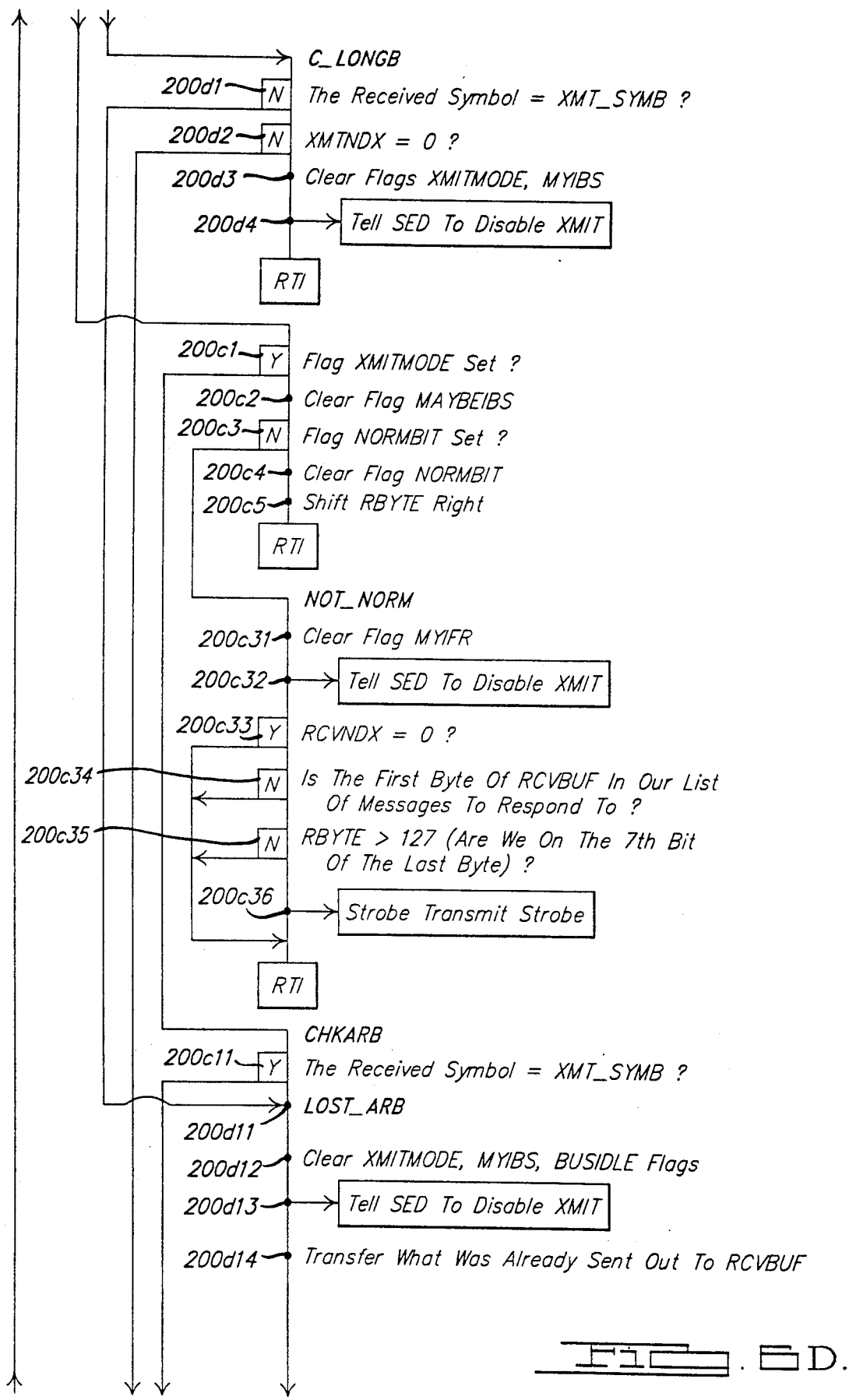
Figure 5E:
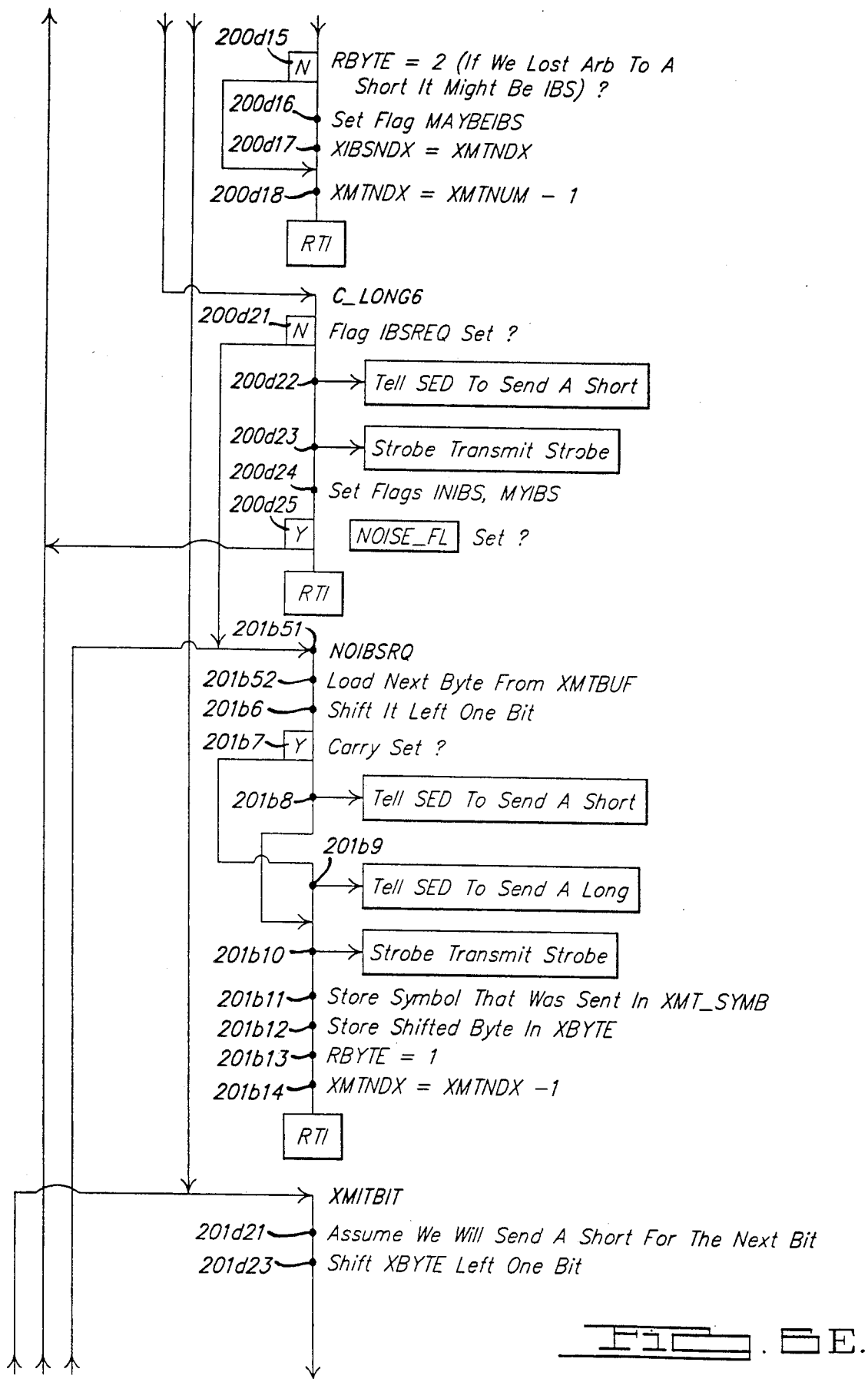
Figure 5F:
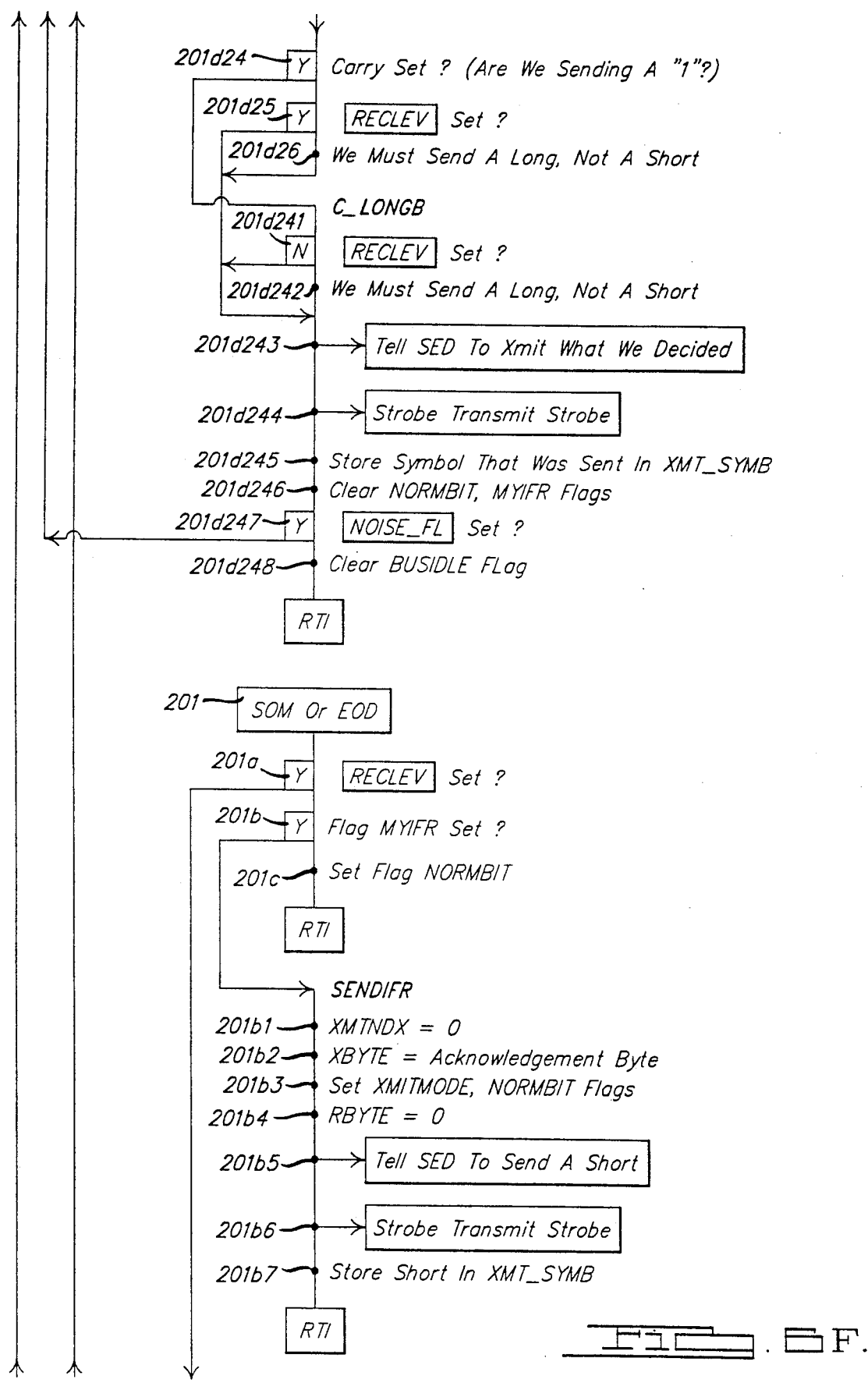
Figure 5G:
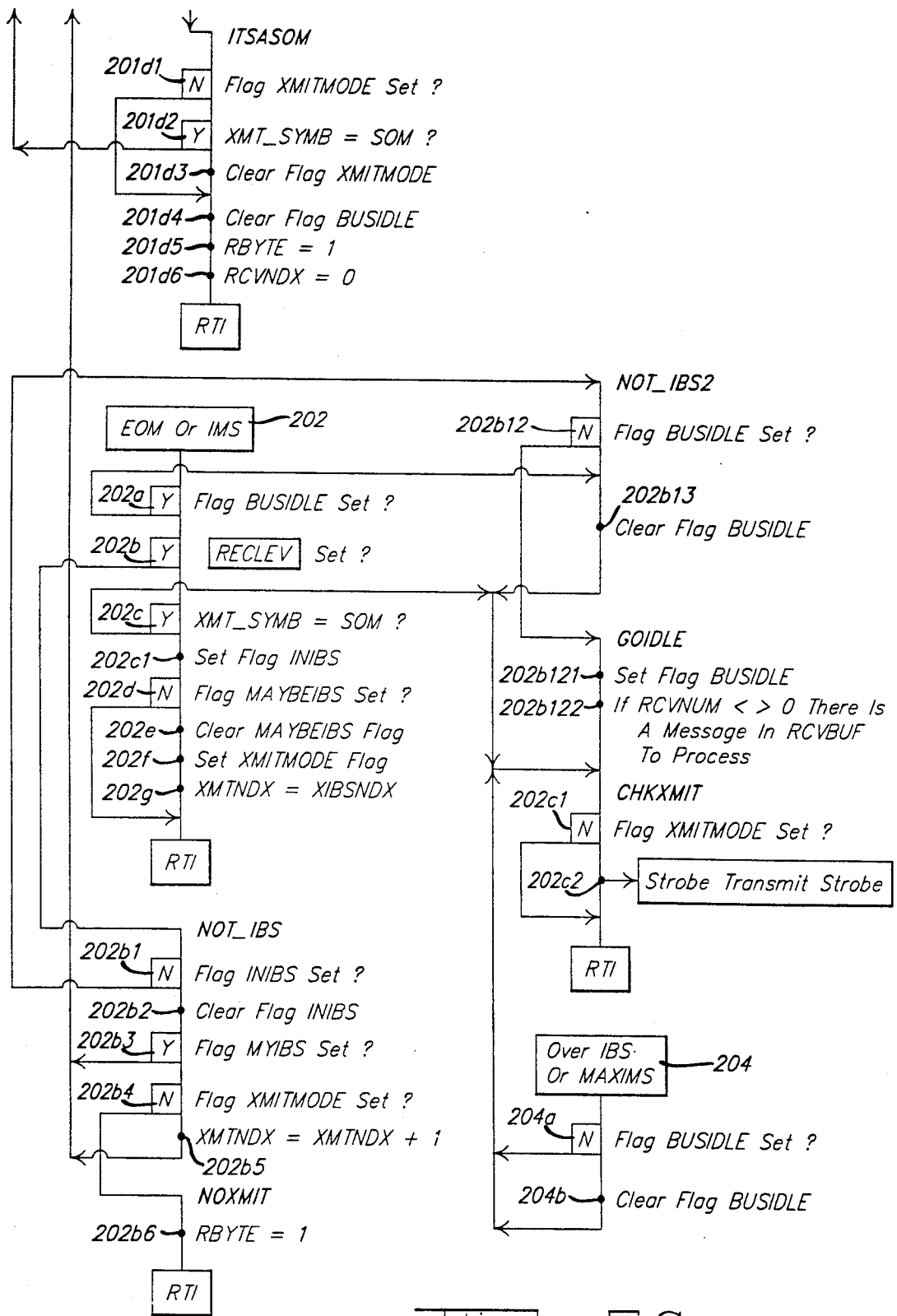

To further explain the operation of SED 22, refer now to the timing diagrams of FIGS. 7-8B.

FIGURE 7

FIG. 7 shows the overall array of electrical signals for encoding and decoding a J1850 VPWM format message. These signal are all SED input/output signals with the exception of the SED internal signals such as the 3 bit up/down, FREC, /RSTCNTS and 10 bit (9:0) signals.

In FIG. 7, the horizontal graduations TP1-TP6 depict time periods for the vertically depicted signals of FIGS. 7a-7t.

FIG. 7a depicts a RESET (/RST) signal sent to SED 22 from MCU 18 to reset all portions of SED usually at start-up. When this signal goes LOW, the system is reset. This figure shows a reset condition only for the first time period (TP1).

FIGS. 7b-7g shows the input signals from MCU 18 used by SED 22 to control transmission of symbols over bus 12. The /TRPR and TRSTRB signals are pulse signals; the /TRCLR signal is a toggle type signal much like /RST; S2,S1 and S0 are address codes for address the decoder ROM 40.

FIG. 7h. depicts the VPWM signal sent to IDR 20 over the TRANS pin of SED 22.

FIG. 7i illustrates the shape of the voltage waveform on bus 12 after IDR 20 reshapes the VPWM signals sent over the TRANS pin from SED 22.

FIG. 7j depicts a VPWM received signal (REC) sent from IDR 20 to SED 22. This signal may be a reflection of the signal sent by SED 22 or a signal sent from another node.

FIG. 7k illustrates the output of the 3 bit up/down counter used to filter the REC input signal.

FIG. 7l illustrates the filtered receive signal FREC) after the 3 bit up/down counter filters the REC input signal.

FIG. 7m depicts the interrupt request (/IRG) signal sent from SED 22 to MCU 18.

FIG. 7n illustrates the RESET COUNTER PULSE (/RSTCNTS) used to reset the receive ROM address counter 90 and the 10 bit counter 42.

FIG. 7o shows the output of the 10 bit counter which measures time between FREC transitions.

FIG. 7p-s depicts output signals to MCU 18 from SED 22 used to relay received bus symbols to MCU 18.

FIG. 7t depicts the NOISE FLAG (NF) signal that SED 22 sends to MCU 18 if noise on BUS 12 results.

FIGURE 8

FIGS. 8A and 8B show the same time periods (TP) that appear in FIG. 7. In FIGS. 8A and 8B however, a much faster time reference is used. The following TP explanation apply to FIG. 7, FIGS. 8A and 8B.

FIGURE 8A

TP1

This time period illustrates the end of RESET within SED 22 (/RST goes HIGH). During a LOW /RST, the CLK and clkdiv2 signals do not change levels even though OSC is changing levels (i.e., the clock generator 30 does not function). When /RST goes HIGH, the clock generator 30 begins to function. The 10 bit counter 42 also begins to count due to the start up of the GATCLKD2 signal.

The action of the ROM ADDRESS MUX 38 can also be seen in this time period. The CLKDIV2 signal is the most significant bit of the 4 bit ROM ADDRESS. FIG. 8Ag illustrates how CLKDIV2 selects between the upper and lower half of ROM 40. Send input signals from MCU 18 (S2,S1,S0) comprise the remaining three address signals when CLKDIV2 is LOW. Here S2,S1 and S0 are all LOW, selecting a transmit ROM value of 1024 (XMIT DISABLED). REC ROM ADDRESS COUNTER 90 outputs (Q2,Q1,Q0) which comprise remaining three address signals when CLKDIV2 is HIGH. Here Q2, Q1 and Q0 are all LOW, selecting a receive ROM value of 34 (REC MIN SHORT).

TP2

This time period illustrates a receive compare. The selected REC ROM value is 34. When the 10 bit counter 42 increments from 33 to 34, it matches the REC ROM value. This match causes the compare signal to go HIGH. REC ROM ADDRESS COUNTER 90 then increments coincident with the rising edge of /CLK. This in turn selects the next REC ROM value of 96. The 10 bit value now no longer matches the REC ROM value, and compare returns to a LOW level.

TP3

This time period illustrates the result of a receive compare with a value of 300. The same response occurs as was illustrated in TP2. Two additional actions also occur. An active HIGH LAT300 pulse is generated. This causes the current value of the REC ROM ADDRESS COUNTER 90 to be latched to output pins R2,R1 AND R0 (R2,R1 and R0 are shown here in decimal form). The inverse value of FREC is also latched to the RECLEV pin. MCU 18 can use the data on these four pins to determine 300 µs LOW has just been received by SED 22. The second additional action is the generation of a MCU 18 interrupt (/IRQ pulses LOW). This tells MCU 18 that SED 22 has just updated the information on output pins R2,R1,R0 and RECLEV.

TP4

This time period shows a receive compare occurring with the value being 1021. The result of this compare is the same as that in TP2, with one additional action. When the REC ROM ADDRESS COUNTER 90 increments, Q2,Q1 and Q0 all go HIGH. This causes the GATCLKD2 signal to remain LOW, suspending the CLK signal to the 10 BIT-COUNTER 42. The 10 BIT COUNTER 42 will hold at a value of 1021 until the next /RSTCNTS pulse occurs.

FIGURE 8B

TP5

This time period illustrate a FREC transition. FIG. 7 shows the events leading up to the FREC transition. The SED 22 causes the TRANS signal to go HIGH. This signal is routed to IDR 20 which drives bus 12 HIGH. IDR 20 reflects the HIGH signal on bus 12 back to SED 22 through the REC pin. When the REC signal has been at a HIGH level long enough for the 3 bit UP/DOWN counter 46 to count to 7, FREC goes HIGH. This causes /IRQ and /RSTCNTS pulses to be generated. The 10BIT COUNTER 42 is reset, and receive address pins R2,R1, R0 and RECLEV signals latch in new data.

Referring to FIG. 8B, some of the above actions can be seen in a faster time frame. Notice that GATCLKD2 is once again enabled, and begins clocking the 10 BIT COUNTER 42.

TP6

This time period shows a transmit compare occurring. Here, the compare value is 181. The result of this transmit compare causes the TRANS signal to toggle. This causes IDR 20 to let bus 12 go LOW, ending the SOM symbol on bus 12. FIG. 8B also shows S2,S1 and S0 values of 011 addressing a ROM value of 181 ("XMIT SOM/EOD 181 µs"). When this ROM value matches the 10 BIT COUNT, the TRANS signal toggles LOW.

Bits 0-7 are transmitted and received in the manner described above.

With reference to FIG. 7i, a short positive pulse can be seen on the bus signal following bit 7. This is an illustration of a noise pulse. The duration of this pulse is not long enough to allow the 3 BIT UP/DOWN COUNTER 46 to count up to 7. Consequently, FREC never changes state, and the noise is effectively filtered out.

Following this pulse is another noise pulse of a longer duration. The 3 BIT COUNTER 46 does not count to 7 and FREC goes HIGH. The noise pulse returns LOW. The 3 BIT COUNTER 46 counts down to 0, and the FREC signal goes LOW. Since FREC was HIGH for less than 34 µs, this constitutes receiving an illegal short symbol. As a result of the noise, noise flag (NF) FIG. 7t is set HIGH. Single noise pulses less than 6.75 µs long will be filtered out by the action of the 3 BIT UP/DOWN COUNTER 46 and related circuits.

INTERACTION OF THE MCU WITH THE SED CHIP

SED chip 22 implements the J1850 variable pulse width modulation line code. The design of this chip also permits implementing other line codings such as unipolar and polar Non-Return to Zero (NRZ); digital bi-phase, diphase or Manchester coding; and modified frequency modulation (MFM).

Hard-wired Signals Between MCU and SED

As mentioned supra, when SED chip 22 initially receives power from a regulated 5 volt power supply 29 (FIG. 2), MCU 18 routes a LOW RESET and an oscillating oscillator output (OSC) signal of a chosen frequency (e.g. 4 MHz) to XMIT/REC CKT 24 (FIG. 3). This initiates operation of node 16.

Software Communication Between MCU and SED

FIG. 6, illustrates in flowchart form, the software operations in MCU 18 used to drive SED chip 22. These charts represent an effort to organize the generation and flow of signals through MCU 18. These flowcharts differ from the conventional box and diamond flow charts.

In these charts, signals entering and leaving the flow of control pass along lines and proceed down the page. Conventional start of program and end of program boxes are used. Trapezoidal or rectangularly shaped boxes indicate signals entering and leaving the flow of control. Actions are signified by a small black circle on the lines, the description of the action being given to the left or right of the flow lines. When introducing a decision, the flow line branches to the right or left. A branch may be caused by either a YES or NO condition, with these being signified by a Y or N in a small box as indicated. An arrowhead depicts where secondary flow rejoins the main flow. A reference number indicates the position or step along the line being discussed.

The software consists of two parts: foreground (non-interrupt routine) or the main program, and background (interrupt routines). External interrupt signals from SED chip 22 trigger into operation the interrupt routines.

The foreground performs the following tasks:

1) Load data into the selected J1850 transmit buffers. The data may include a check sum routine or a Cyclic Redundancy Check (CRC) characters for error detection purposes as well;

2) Poll the input and output ports to determine the state of the bus.

3) Initiate transmissions over the bus. Transmissions occur when an idle bus state exists, i.e., the bus must remain LOW for 300 µs; and 4) Determine the need for inter-byte separation (IBS) during transmissions.

Preprogramming Functions

A Programmer, using an assembler to modify a Read Only Memory (ROM) 18A, in MCU 18, configures the input/output (I/O) ports for communication with SED chip 22 on start up. At least twelve (12) of the 24 I/O ports are configured so that seven (7) Port B terminals provide output signals to the XMIT/REC CKT 24 of FIG. 3, to the XMIT CKT 26 of FIG. 3 and a single signal to the REC CKT 28 of FIG. 4. Five (5) Port A terminals provide input ports for signals from REC CKT 28 of FIG. 4. The programmer stores a start-up program in a Read Only Memory (ROM) that causes MCU 18 to address Ports A and B Data Direction Registers at locations hexadecimal ($) $04 and $05 of the selected microcontroller.

For this embodiment, an 8-bit Microcontroller Unit Model No. MC68HC05C4 from Motorola Inc., Microcontroller Division, Oak Hill, Texas serves as MCU 18.

The Programmer also uses the assembler to establish future unconditional locations in a Random Access Memory (RAM)18B in MCU 18 that represent a table of variables as one (1) byte buffers and various one (1) bit flags (a software analogy of a flip-flop) for us during transmission and reception of symbol signals between MCU 18 and SED chip 22.

Table 1 and 2 list the mnemonic and operation of each variable and flag respectively.

TABLE 1 (VARIABLES)

RBYTE Current received byte (used by IRQ)
RCVNDX Index into RCVBUF (used by IRQ)
RCVBUF Receive buffer (12 Bytes)
RCVNUM Number of bytes in RCVBUF (set by IRQ when complete message is received)
XMT-SYMB Last transmitted symbol (used by IRQ)
XBYTE Current transmit byte (used by IRQ but initialized in foreground)
XMTBUF Transmit buffer (12 bytes)
XMTNUM Number of bytes in transmit buffer
XMTNDX Index into transmit buffer (used by IRQ)
XIBSNDX Holding index into transmit buffer if we suspect we lost arbitration to an IBS

TABLE 2 (FLAGS)

XMITMODE Indicates we are in transmit mode
BUSIDLE Indicates the J1850 bus is idle
IBSREQ Request for IBS (set by foreground to slow a transmission)
INIBS Indicates we are currently in an IBS
MYIBS Indicates that we have initiated an IBS
MYIFR Indicates we have initiated an in-frame response
NORMBIT Indicates the next bit is a normalization bit

Main Program Operation

The initial instruction, a housekeeping instruction, at step 140 of FIG. 6, causes MCU 18 to configure the bidirectional input/output (I/O) ports for establishing communication with SED chip 22.

After configuring the I/O ports, the main program at step 142 instructs MCU 18 to store at port B3 and B5 respectively, HIGH transmit preset (/TRPRE) and transmit clear (/TRCLR) signals for use by XMIT CKT 26. These signals place XMIT CKT 26 in condition for accepting messages for transmission over bus 12.

At step 144, the program instructs MCU 18 to clear all RAM locations of variables and flags. These location could have random data at start up.

TASK DISPATCHER

When the program advances to step 146, it enters into a task dispatcher routine. This control routine selects from the task queue (list) the next processing task and gives that task control of the central processing unit (CPU).

As the task dispatcher, MCU 18 fetches the content of either a string of variable bytes, flags or I/O ports to determine whether to go into a transmitting or receiving mode.

Checking the status of the Sensor

At step 146, MCU 18 reads input port C to see if sensor 14 has outputted a signal. A signal at this port may put MCU 18 in a transmitting mode.

Checking the Status of the Bus

MCU 18 sequences to the next task at step 148 of determining the content of the receive number byte. If no message appears on bus 12 of FIG. 1, then the RCVNUM byte will show 0; if a message does appear on bus 12, then the RCVBUF, which holds up to 12 bytes, will contain a message. MCU 18 will decode the message and process it if desired. If an inappropriate or undesirable message appears on the bus, MCU 18 may skip processing it and wait for the next message. MCU 18 makes this determination by using error detection schemes such as Checksum and Cyclic redundancy Checks (CRC) or by ID and address checks for unwanted data. Either way, the contents of the RCVNUM byte are returned to "0". Afterward, the task dispatcher routine recirculates and reenters the task dispatcher loop. (See steps 146, 148, 176, 178 and 180).

An IRQ would occur if a message appears on bus 12 and the decoding of the message takes place in the background routines, explained intra.

Transmitting a Message

To transmit a message, MCU 18 must receive an input signal from a sensor or a keyboard serving in the place of a sensor.

Assume when MCU 18 reads the sensor signal or keyboard entry at port C, a signal appears. Then MCU 18 will enter a transmit mode.

Obtaining a Message from a Sensor

If no IRQ's interrupt the sequencing of the main program, then the RCVNUM byte will contain a "0" and the task dispatching will look to determine if the XMTNUM byte contains a "0". Since MCU 18 is not transmitting as of yet, the program will execute a branch instruction which will allow the empty XMTBUF to fill up with the operational code (op code) equal to the value of the decoded sensor signal, illustratively, $(1100\ 0000)_2$ indicative of a "door ajar" message. (This fictional message is being used for illustrative purposes. Real messages are usually 3-12 bytes long). MCU 18 has the option to not fill XMTBUF if the message would be inappropriate at this time.

Since the "door ajar" message contains only one (1) byte, the XMTNUM byte will contain the number 1. (See steps 146, 150, 172 and 174).

Monitoring the Bus By Checking for a Bus Idle Flag

MCU 18 now poised to communicate with SED chip 22 after fetching a message, the main program again recirculates to step 146 to again read port C for a sensor output signal. More than likely, the "door ajar" message will still exists, the RCVNUM byte will contain a 0, but the XMTNUM byte will contain a count of 1 byte. If bus 12 remains idle for 300 μs, SED 22 will send a 300 μs IRQ to MCU 18. The BUSIDLE flag will set indicating bus 12 is idle and message may be transmitted. (See steps 146, 148, 150, 152 and 154).

Starting Transmission of a Message By Sending A SOM Symbol

The program will sequence to the next instruction outside of the task dispatcher and cause MCU 18 to execute the 22 in a position to transmit a start of frame (SOF) or start of message ( SOM) routine, (these two routines and acronyms are synonymous) by providing S-addresses at port B2,B1 & B0, respectively, indicative of SOF code (011) and strobe /TRPRE($\tau$=a HIGH to LOW pulse) and TRSTRB($\perp$=a LOW to HIGH pulse) pins at port B3 & B6 respectively. (See steps 156, 158, and 160)

Then MCU 18 will put the SOF symbol in the XMT-SYMB byte, the current receive byte (RBYTE) will equal $(0000\ 0001)_2$, the current XBYTE will equal the content of the XMTBUF $(1100\ 0000)_2$, the XMTNDX will equal XMTNUM−1 or 0, the RCVNDX byte will equal 0 since bus 12 does not contain a symbol message. The main program continues to loop through the task dispatcher monitoring the sensor and the bus. (See steps 162 through 170).

SED Chip Response to the Leading Edge of the SOF Symbol

SED Chip 22 wants to measure the time the previous symbol remained on bus 12, the time previous to the leading edge transition of the SOF symbol.

Almost immediately after receiving the leading edge of the SOF symbol from MCU 18, SED chip 22 sends an /IRQ pulse to port A2, a LOW RCV-LVL signal at port A3 and an R-address, 3-bit code (111) to port A0,A1 & A2. With the /IRQ, SED chip 22 informs MCU 18 that a leading edge appeared; with the R-address, previous to this leading edge, a maximum inter-message separation period occurred in which bus 12 remained LOW for at least 300 μs and with the LOW RCV-LVL signal, a high signal now appears on bus 12.

MCU 18 Response to the MAXIMS Interrupt Signal From SED Chip

An IRQ enters the background routine and MCU 18 reads the incoming R-code, decodes the R-code and then branches to the appropriate routine (at this time, a maximum inter-message separation (MAXIMS) routine) at step 204. (See steps 192, 194 and 204).

In the MAXIMS routines (step 204), MCU 18 examines the BUSIDLE flag flip-flop (FF) for a set (logic "1") condition, knowing that message transmissions start with the bus in an idle state. A set BUSIDLE flag exists, therefore MCU 18 clears the BUSIDLE flag to indicate that bus 12 is no longer idle. The program branches to the CHKXMIT routine at step 202c1. (See steps 204a and 204b).

In the CHKXMIT routine, MCU 18 examines the status of the XMITMODE flag. Since the XMITMODE flag was previously set, MCU 18 puts a TRSTRB(⊥) pulse at port B6 enabling SED chip 22 to transmit the remaining portion of the SOF message; then the CHKXMIT routine terminates with a return from interrupt instruction (RTI). (See steps 202c1 and 202c2).

SED Chip Response to the Falling Edge of the SOF Symbol

When the falling edge of the SOF symbol occurs, bus 12 goes LOW, and SED chip 22 generates another /IRQ (τ)pulse, a HIGH RCV-LVL signal and a R-address code of (011) to indicate the type symbol i.e., the SOM symbol.

MCU 18 Response to the SOM Symbol

MCU 18 fetches an /IRQ(T) pulse from its IRQ port; the R2, R1 & R0 codes from port A2, A1 & A0; decodes the symbol address from SED chip 22 (obtaining an address of 011) and then branches to the appropriate service routine (SOM or EOD) at step 201. (see steps 192, 194 and 201).

SOM Routine

In step 201, MCU 18 receives instructions to read the RVCLVL signal at port B3 to determine if the incoming symbol address represents a SOM or an EOD. A HIGH or set level of the RVC-LVL signal indicates a SOM symbol, a LOW level indicates an end-of-data (EOD) symbol. Since SED Chip 22 sent a HIGH RCV-LVL signal, the program instructs MCU 18 to branch to the ITSASOM routine at step 201d1. See step 201d).

ITSASOM Routine

In the ITSASOM routine, MCU 18 determines if a XMITMODE flag was set in the main program. This test determines whether the SOM symbol originated from the source node or another node. If the SOM symbol originated from another node, then MCU 18 clears the XMITMODE flag, sets the RBYTE to 1 and the RCVNDX to 0 in preparation to receive the message from the other node.

If a set XMITMODE flag exists, MCU 18 determines if the XMT-SYMB byte contains the code for a SOM symbol. If it does not, then MCU 18 clears the XMITMODE flag and prepares to receive the message from the other node. If the XMIT-SYMB byte contains the code for a SOM, then the program branches to a XMITBIT routine (step 201d21). (See steps 201d1, 201d2, 201d3, 201d4, 201d5 and 201d6).

MCU Sending the MSB of the Message

Assuming MCU 18 originated the SOM, MCU 18 must now sent the first bit of the sensor message to SED chip 22. A logic 1 forms the first (most significant) bit of the "door ajar" message. But a logic 1 could be a either a long LOW or a short HIGH. However, since the SOM was HIGH and the bus changes levels after each symbol, it must be a long LOW.

The J1850 pulse format the "door ajar" message consists of two (2) nibbles (1100 0000): the higher weighted nibble=a long LOW (1) for the MSB, a short HIGH (1) for the next to the MSB, a short LOW (0) for the next to the least significant bit (LSB) and a long HIGH (0) for the LSB; and the lower weighted nibble=a short LOW (0) for the MSB, a long HIGH (0) for the next to MSB, a short LOW (0) for the next to the LSB and long HIGH (0) for the LSB.

XMITBIT Routine

In the XMITBIT routine, MCU 18 receives instructions to assume that the MSB will require a SHORT symbol. MCU 18 then receives an instruction to shift the XBYTE the current transmit byte one bit to the left. The byte to be shifted is the fictitious message byte for a "door ajar" message having the contents of (1100 0000). After the shift, the MSB of XBYTE will locate in the carry flag FLIP-FLOP(CFF); (CFF=[1]) and the shifted new byte will look as follows: (1000 0000). Then MCU 18 determines if a set carry bit exists. Since the MSB of the higher nibble of the message equals a logic 1, then a set carry bit exists and MCU 18 branches to a C-LONG8 routine (step 201d241). (See steps 201d21, 201d22, 201d23, & 201d24)

Sending the Symbol for the MSB of the Higher Nibble

MCU 18 must get the signal at port B3 and determine if RCV-LVL is HIGH or set. Since a SOM equals a 200 μs HIGH signal, a HIGH RCV-LVL signal would signify a completed SOM symbol, the previous bit was HIGH and the bus level is now LOW. Hence, MCU 18 must send a long LOW, not a short HIGH. MCU 18 must put at port B0,B1 & B2 the S-codes that would generate a long LOW in association with the level of the previous bit, strobe TRSTRB pin at port B6, store the symbol that was sent in the XMT-SYMB byte, clear the NORMBIT and MYIFR flags, then get the NF signal from port A4 and determine if the noise-flag has been set. If a set noise flag exists, then MCU 18 would take steps to stop transmitting.

If the noise flag is not set, then MCU 18 clears the BUSIDLE flag (so that the foreground will wait for bus 12 to go idle) and then performs a return from interrupt (RTI) instruction. (See steps 201d241, 201d242, 201d243, 201d244, 201d245, 201d246, 201d247 & 201d248).

SED Chip Response to the MSB Symbol of the Higher Nibble

SED chip 22 issues an IRQ (τ) pulse, an R-code of (010) indicating a previous symbol equalled a LONG LOW (128 μs) or a logic 1 MSB of the higher nibble of the message and a LOW RCV-LVL signal indicating a HIGH bus voltage level when the trailing edge transition occurs.

MCU Response to SED Chip LONG Symbol IRQ for the MSB

MCU 18 receives the /IRQ (τ) pulse and at step 192 reads the R-code (010), decodes the R-pins and then branches to the appropriate service routine (step 194), in this case, the LONG routine at step 200. This R-address tells MCU 18 that the time on the bus since the previous symbol was 128 μs.

MCU 18 must make sure that the symbol reflected back equals the symbol sent (i.e., no lost of arbitration); otherwise, MCU 18 must stop transmitting.

The LONG Routine for Verifying 128 μs on the Bus for the MSB

In the long routine, MCU 18 receives instructions to decode the symbol into a bit, rotate the bit into the RBYTE, and determine if the carry bit is clear. The CFF=[0] and the new RBYTE equals (0000 0011) for the MSB. Then, MCU 18 receives instructions to look for a set XMITMODE flag. Since MCU 18 is in the transmit mode and had been waiting for the reflected bit from SED Chip 22, a set XMITMODE flag exists. MCU 18 must then branch to CHKARB at step 200c11. (See steps 200a, 200b, 200c & 200c1).

CHKARB Routine for MSB Symbol

In the CHKARB routine, MCU 18 receives instructions to determine if the received symbol for the MSB equals the symbol in the XMT-SYMB byte. If yes, MCU 18 branches to XMITBIT routine at step 201d21 in order to send the next bit. Assuming a match occurred, MCU 18 must prepare to send the next bit. (See step 200c11).

MCU Transmitting the Higher Nibble Next-to-MSB

In the XMITBIT routine, since a short HIGH represents the higher nibble next-to-MSB, MCU 18 must shift the next-to-MSB into the XBYTE location of RAM and then check for a set CFF. Since a logic 1 equals the next-to-MSB of the message, then a set carry exists CFF=[1] (XBYTE=0000 0000). Hence, MCU 18 branches to the C-LONG8 routine at step 201d241. (See steps 201d21, 201d22, 201d23 & 201d24).

C-LONG8 Routine for Transmitting the Higher Nibble Next MSB

In C-LONG8, MCU 18 must check for a HIGH RCV-LVL signal at port 3. Since a logic 1 higher order nibble next to the MSB equals a short HIGH signal, a LOW RCV-LVL signal would signify a completed logic 1 MSB and the previous bit was a long LOW. Hence, MCU 18 must put at port B2,B1 & B0 the S-codes that would generate a short HIGH in association with the level of the previous bit to create another logic 1 symbol. MCU 18 puts an address code of 001 representing a short at port B, strobes the TRSTRB port B6, stores the short symbol in XMT-SYMB, clears the NORMBIT and MYIFR flags, check for a set NOISE-FL and then clear the BUSIDLE flag before receiving a RTI (See steps 201d241, 201d242, 201d243, 201d244, 201d245, 201d246, 201d247 and 201d248.

SED Chip response to Address for Higher Nibble Next to MSB

SED chip 22 issues an IRQ (τ) pulse, an R-code of (001) indicating a previous symbol equalled a HIGH SHORT and a HIGH RCV-LVL signal indicating a LOW bus voltage level when the trailing edge transition occurs.

MCU Response to IRQ Higher Nibble Next to MSB

MCU 18 receives the /IRQ (T) pulse and at step 192 reads the R-code (001), decodes the R-pins and then branches to the appropriate service routine (step 194), in this case, the SHORT routine at step 198. MCU 18 must make sure that the symbol reflected back equals the symbol sent (i.e., no lost of arbitration); otherwise, MCU 18 must stop transmitting. (See steps 192, 194 and 198)

The SHORT Routine for Verifying a HIGH Short Next to MSB

In the short routine, MCU 18 receives instructions to check for a set INIBS flag FF (in case we sent an IBS). Assuming none exists, the program branches to an instruction requiring a reading of port A3 to see the RCV-LVL signal from SED Chip 22 and place value in CFF. Since SED Chip 22 sent a HIGH RCV-LVL signal, CFF=[1]. MCU 18 must rotate [1] from CFF into the RBYTE from the right side and determine if the carry bit is clear. CFF becomes [0] and the new R-BYTE equals (0000 0111). Then the SHORT routine extends to step 200c1 where MCU 18 receives instructions to check for a set XMITMODE flag. Since MCU 18 is transmitting, it is assumed a set XMITMODE flag exists and the program branches to the CHKARB routine at step 200c11. (See steps 198, 198a, 199, 200b, 200c & 200c1).

MCU Checking arbitration (CHKARB) of the Next to MSB

MCU 18 checks to see if the received symbol from SED chip 22 equals the transmitted symbol. Assuming correspondence, the program then branches to XMITBIT routine at step 201d21. (See step 200c11).

MCU Transmits the Higher Nibble Next to the LSB to SED Chip

In the XMITBIT routine, since a short LOW represents the higher nibble next-to-LSB, MCU 18 must shift the XBYTE to the left one bit to place this bit in the CFF. XBYTE looks as follows (0000 0000). Then MCU 18 must check for a set CFF. Since this shift places a [0] in the CFF, MCU 18 must then check the level of the RCV-LVL pin for a HIGH. Since the previous symbol was a HIGH short, a HIGH RCV-LVL appears. Thus, MCU 18 must transmit to SED chip 22 the S-code address for a short LOW (001) to represent a logic 0 bit next-to LSB. MCU 18 also has to strobe the TRSTRB pin to cause a TRSTRB (⊥)signal, store the short LOW symbol in XMT-SYMB byte, clear the NORMBIT and MYIFR flags, check for a high NOISE-FL signal from SED Chip 22 and then clear the BUSIDLE flag before receiving a RTI instruction. (See steps 201d21, 201d23, 201d24, 201d25, 201d245, 201d246, 201d247 & 201d248).

SED Chip response to Address for Higher Nibble Next to LSB

SED chip 22 issues an IRQ (T) pulse, an R-code of (001) indicating a previous symbol equalled a LOW SHORT and a LOW RCV-LVL signal indicating a HIGH bus voltage level when the trailing edge transition occurs.

MCU Response to IRQ Higher Nibble Next to LSB

MCU 18 receives the /IRQ (T) pulse and at step 192 reads the R-code (001), decodes the R-pins and then branches to the appropriate service routine (step 194), in this case, the SHORT routine at step 198. MCU 18 must make sure that the symbol reflected back equals the symbol sent (i.e., no lost of arbitration); otherwise, MCU 18 must stop transmitting. (See steps 192, 194 and 198).

The SHORT Routine for Verifying a LOW Short Next to LSB

In the short routine, MCU 18 receives instructions to check for a set INIBS flag FF. Assuming none exists, the program branches to an instruction requiring a reading of port A3 to see the RCV-LVL signal from SED Chip 22 and place value in CFF. Since SED Chip 22 sent a LOW RCV-LVL signal, CFF=[0]. MCU 18 must rotate [0] from CFF into the RBYTE from the right side and determine if the carry bit is clear. CFF becomes [0] and the new R-BYTE equals (0000 1110). Then the SHORT routine extends to step 200c1 where MCU 18 receives instructions to check for a set XMITMODE flag. Since MCU 18 is transmitting, it is assumed a set XMITMODE flag exists and the program branches to the CHKARB routine at step 200c11. (See steps 198, 198a, 199, 200b, 200c & 200c1).

MCU Checking arbitration (CHKARB) of the Next to LSB

MCU 18 checks to see if the received symbol from SED chip 22 equals the transmitted symbol. Assuming correspondence, the program then branches to XMITBIT routine at step 201d21. (See step 200c11).

MCU Transmits the Higher Nibble LSB to SED Chip

In the XMITBIT routine, since a long LOW represents the higher nibble LSB, MCU 18 must shift the XBYTE to the left one bit. XBYTE looks as follows: (0000 000). Then MCU 18 must check for a set CFF. Since this shift places a [0] in the CFF, MCU 18 must then check the level of the RCV-LVL pin for a LOW. Since the previous symbol was a LOW short, a LOW RCV-LVL appears. Thus, MCU 18 must transmit to SED chip 22 the S-code address for a long HIGH (010) to represent a logic 0 LSB. MCU 18 also has to strobe the TRSTRB pin to cause a TRSTRB (⊥)signal, store the long HIGH symbol in XMT-SYMB byte, clear the NORMBIT and MYIFR flags, check for a low NOISE-FL signal from SED Chip 22 and then clear the BUSIDLE flag before iving a RTI instruction. (See steps 201d21, 201d23, 201d24, 201d25, 201d245, 201d246, 201d247 & 201d248).

SED Chip response to Address for Higher Nibble LSB

SED chip 22 issues an IRQ (T) pulse, an R-code of (010) indicating a previous symbol equaled a long HIGH and a HIGH RCV-LVL signal indicating a LOW bus voltage level when the trailing edge transition occurs.

MCU Response to IRQ Higher Nibble LSB

MCU 18 receives the /IRQ () pulse and at step 192 reads the R-code (010), decodes the R-pins and then branches to the appropriate service routine (step 194), in this case, the LONG routine at step 200. MCU 18 must make sure that the symbol reflected back equals the symbol sent (i.e., no lost of arbitration); otherwise, MCU 18 must stop transmitting. (See steps 192, 194 and 200).

The LONG Routine for Verifying a HIGH Long LSB

In the long routine, MCU 18 receives instructions to decode the symbol into a bit, the bit equalling 0 rotate the bit into the RBYTE, and determine if the carry bit is clear. The CFF=[0] and the new R-BYTE equals (0001 1100) for the LSB. Then, MCU 18 receives instructions to look for a set XMITMODE flag. Since MCU 18 is in the transmit mode and had been waiting for the reflected bit from SED Chip 22, a set XMITMODE flag exists. MCU 18 must then branch to CHKJB at step 200c11. (See steps 200a, 200b, 200c & 200c1).

CHKARB Routine for Higher Nibble LSB Symbol

In the CHKARB routine, MCU 18 receives instructi to determine if the received symbol for the LSB equals the symbol in the XMT-SYMB byte. If yes, MCU 18 branches to XMITBIT routine at step 201d21 in order to send the next bit. Assuming a match occurred, MCU 18 must prepare to send the next bit. (See step 200c11).

MCU Transmits the Lower Nibble MSB to SED Chip

In the XMITBIT routine, since a short LOW represents the lower nibble MSB, MCU 18 must shift the XBYTE to the left one bit. XBYTE looks as follows: (0000 0000). Then MCU 18 must check for a set CFF. Since this shift places a [0] in the CFF, MCU 18 must then check the level of the RCV-LVL pin for a HIGH. Since the previous symbol was a long HIGH, a HIGH RCV-LVL appears. Thus, MCU 18 must transmit to SED chip 22 the S-code address for a short LOW (001) to represent a logic 0 lower nibble MSB. MCU 18 also has to strobe the TRSTRB pin to cause a TRSTRB (⊥)signal, store the short LOW symbol in XMT-SYMB byte, clear the NORMBIT and MYIFR flags, check fcr a low NOISE-FL signal from SED Chip 22 and then clear the BUSIDLE flag before receiving a RTI instruction. (See steps 201d21, 201d23, 201d24, 201d25, 201d245, 201d246, 201d247 & 201d248).

SED Chip response to Address for Lower Nibble MSB

SED chip 22 issues an IRQ (T) pulse, an R-code of (001) indicating a previous symbol equalled a LOW SHORT and a LOW RCV-LVL signal indicating a HIGH bus voltage level when the trailing edge transition occurs.

MCU Response to IRQ Lower Nibble MSB

MCU 18 receives the /IRQ (┬) pulse and at step 192 reads the R-code (001), decodes the R-pins and then branches to the appropriate service routine (step 194), in this case, the SHORT routine at step 198. MCU 18 must make sure that the symbol reflected back equals the symbol sent (i.e., no lost of arbitration); otherwise, MCU 18 must stop transmitting. (See steps 192, 194 and 198).

The SHORT Routine for Verifying a Lower Nibble LOW Short MSB

In the short routine, MCU 18 receives instructions to check for a set INIBS flag FF. Assuming none exists, the program branches to an instruction requiring a reading of port A3 to see the RCV-LVL signal from SED Chip 22 and place value in CFF. Since SED Chip 22 sent a LOW RCV-LVL signal, CFF=[0]. MCU 18 must rotate [0] from CFF into the RBYTE from the right side and determine if the carry bit is clear. CFF becomes [0] and the new R-BYTE equals (0011 1000). Then the SHORT routine extends to step 200c1 where MCU 18 receives instructions to check for a set XMIT-MODE flag. Since MCU 18 is transmitting, it is assumed a set XMITMODE flag exists and the program branches to the CHKARB routine at step 200c11. (See steps 198, 198a, 199, 200b, 200c & 200c1).

CHKARB Routine for Lower Nibble MSB Symbol

In the CHKARB routine, MCU 18 receives instructions to determine if the received symbol for the MSB equals the symbol in the XMT-SYMB byte. If yes, MCU 18 branches to XMITBIT routine at step 201d21 in order to send the next bit. Assuming a match occurred, MCU 18 must prepare to send the next bit. (See step 200c11).

MCU Transmits the Lower Nibble Next-to-MSB to SED Chip

In the XMITBIT routine, since a long HIGH represents the lower nibble next-to-MSB, MCU 18 must shift the XBYTE to the left one bit. XBYTE looks as follows: (0000 0000). Then MCU 18 must check for a set CFF. Since this shift places a [0] in the CFF, MCU 18 must then check the level of the RCV-LVL pin for a LOW. Since the previous symbol was a short LOW, a LOW RCV-LVL appears. Thus, MCU 18 must transmit to SED chip 22 the S-code address for a long HIGH (010) to represent a logic 0 lower nibble next-to-MSB. MCU 18 also has to strobe the TRSTRB pin to cause a TRSTRB (⊥)signal, store the short LOW symbol in XMT-SYMB byte, clear the NORMBIT and MYIFR flags, check for a low NOISE-FL signal from SED Chip 22 and then clear the BUSIDLE flag before receiving a RTI instruction. (See steps 201d21, 201d23, 201d24, 201d25, 01d245, 201d246, 201d247 & 201d248).

SED Chip Response to Address for Lower Nibble Next-to-MSB

SED chip 22 issues an IRQ (┬) pulse, an R-code of (010) indicating a previous symbol equalled a LONG HIGH and a HIGH RCV-LVL signal indicating a LOW bus voltage level when the trailing edge transition occurs.

MCU Response to IRQ for the Next-to-MSB

MCU 18 receives the /IRQ (┬) pulse and at step 192 reads the R-code (010), decodes the R-pins and then branches to the appropriate service routine (step 194), in this case, the LONG routine at step 200. This R-address tells MCU 18 that the time on the bus since the previous symbol was 128 μs. MCU 18 must make sure that the symbol reflected back equals the symbol sent (i.e., no lost of arbitration); otherwise, MCU 18 must stop transmitting.

The LONG Routine for Verifying 128 s on the Bus for the Next-to-MSB

In the long routine, MCU 18 receives instructions to decode the symbol into a bit, rotate the bit into the RBYTE, and determine if the carry bit is clear. The CFF=[0] and the new R-BYTE equals (0111 0000) for the next-to-MSB. Then, MCU 18 receives instructions to look for a set XMITMODE flag. Since MCU 18 is in the transmit mode and had been waiting for the reflected bit from SED Chip 22, a set XMITMODE flag exists. MCU 18 must then branch to CHB at step 200c11. (See steps 200a, 200b, 200c & 200c1).

CHKARB Routine for Next-to-MSB Symbol

In the CHKARB routine, MCU 18 receives instructions to determine if the received symbol for the Next-to-MSB equals the symbol in the XMT-SYMB byte. If yes, MCU 18 branches to XMITBIT routine at step 201d21 in order to send the next bit. Assuming a match occurred, MCU 18 must prepare to send the next bit. (See step 200c11).

MCU Transmits the Lower Nibble Next-to-LSB to SED Chip

In the XMITBIT routine, since a short LOW represents the lower nibble next-to-LSB, MCU 18 must shift the XBYTE to the left one bit. XBYTE looks as follows: (0000 0000). Then MCU 18 must check for a set CFF. Since this shift places a [0] in the CFF, MCU 18 must then check the level of the RCV-LVL pin for a HIGH. Since the previous symbol was a long HIGH, a HIGH RCV-LVL appears. Thus, MCU 18 must transmit to SED chip 22 the S-code address for a short LOW (001) to represent a logic 0 lower nibble next-to-LSB. MCU 18 also has to strobe the TRSTRB pin to cause a TRSTRB (⊥)signal, store the short LOW symbol in XMT-SYMB byte, clear the NORMBIT and MYIFR flags, check for a low NOISE-FL signal from SED Chip 22 and then clear the BUSIDLE flag before receiving a RTI instruction. (See steps 201d21, 201d23, 201d24, 201d25, 201d245, 201d246, 201d247 & 201d248).

SED Chip response to Address for Lower Nibble Next-to-LSB

SED chip 22 issues an IRQ (┬) pulse, an R-code of (001) indicating a previous symbol cqualled a LOW SHORT and a LOW RCV-LVL signal indicating a HIGH bus voltage level when the trailing edge transition occurs.

MCU Response to IRQ Lower Nibble Next-to-LSB

MCU 18 receives the /IRQ (┬) pulse and at step 192 reads the R-code (001), decodes the R-pins and then branches to the appropriate service routine (step 194), in this case, the SHORT routine at step 198. MCU 18 must make sure that the symbol reflected back equals the symbol sent (i.e., no lost of arbitration); otherwise, MCU 18 must stop transmitting. (See steps 192, 194 and 198).

The SHORT Routine for Verifing a LOW Short Next-to-LSB

In the short routine, MCU 18 receives instructions to check for a set INIBS flag FF. Assuming none exists, the program branches to an instruction requiring a reading of port A3 to see the RCV-LVL signal from SED Chip 22 and place value in CFF. Since SED Chip 22 sent a LOW RCV-LVL signal, CFF=[0]. MCU 18 must rotate [0] from CFF into the RBYTE from the right side and determine if the carry bit is clear. CFF becomes [0] and the new R-BYTE equals (1110 0000). Then the SHORT routine extends to step 200c1 where MCU 18 receives instructions to check for a set XMITMODE flag. Since MCU 18 is transmitting, it is assumed a set XMITMODE flag exists and the program branches to the CHKARB routine at step 200c11. (See steps 198, 198a, 199, 200b, 200c & 200c1).

CHKARB Routine for Next-to-LSB Symbol

In the CHKARB routine, MCU 18 receives instructions to determine if the received symbol for the Next-to-LSB equals the symbol in the XMT-SYMB byte. If yes, MCU 18 branches to XMITBIT routine at step 201d21 in order to send the next bit. Assuming a match occurred, MCU 18 must prepare to send the next bit. (See step 200c11).

MCU Transmits the Lower Nibble LSB to SED Chip

In the XMITBIT routine, since a short LOW represents the lower nibble LSB, MCU 18 must shift the XBYTE to the left one bit. XBYTE looks as follows: (0000 0000). Then MCU 18 must check for a set CFF. Since this shift places a [0] in the CFF, MCU 18 must then check the level of the RCV-LVL pin for a LOW. Since the previous symbol was a short LOW, a LOW RCV-LVL appears. Thus, MCU 18 must transmit to SED chip 22 the S-code address for a long HIGH (010) to represent a logic 0 lower nibble LSB. MCU 18 also has to strobe the TRSTRB pin to cause a TRSTRB (⊥)signal, store the long HIGH symbol in XMT-SYMB byte, clear the NORMBIT and MYIFR flags, check for a low NOISE-FL signal from SED Chip 22 and then clear the BUSIDLE flag before receiving a RTI instruction. (See steps 201d21, 201d23, 201d24, 201d25, 201d245, 201d246, 201d247 & 201d248).

SED Chip Response to Address for Lower Nibble LSB

SED chip 22 issues an IRQ (⊤) pulse, an R-code of (001) indicating a previous symbol equalled a LOW SHORT and a LOW RCV-LVL signal indicating a HIGH bus voltage level when the trailing edge transition occurs.

MCU Response to IRQ Lower Nibble LSB

MCU 18 receives the /IRQ (⊤) pulse and at step 192 reads the R-code (010), decodes the R-pins and then branches to the appropriate service routine (step 194), in this case, the LONG routine at step 198. MCU 18 must make sure that the symbol reflected back equals the symbol sent (i.e., no lost of arbitration); otherwise, MCU 18 must stop transmitting. (See steps 192, 194 and 198).

The LONG Routine for Verifying 128 s on the Bus for the LSB

In the long routine, MCU 18 receives instructions to decode the symbol into a bit, rotate the bit into the RBYTE, and determine if a clear carry bit exists. The CFF=[1] and the new R-BYTE equals (1100 0000) for the LSB. Then, MCU 18 receives instructions to look for a set XMITMODE flag. Since MC 18 is in the transmit mode and had been waiting for the reflected bit from SED Chip 22, a set XMITMODE flag exists. must then branch to CLONGB at step 200d1. (See steps 200a, 200b, 200c, 200d).

CLONGB Routine for LSB

MCU18 receives instructions to determine if the received symbol equal XMT-SYMB=short.

What is claimed is:

1. A symbol encoder decoder (SED) system used in a node of a multinode, collision-resolution, multiplexing, data-link, for translating a chosen measure and from an input device into variable pulse width modulated (VPWM) line codings of symbols, wherein each symbol is of a different pulse width prescribed for use by an associated analog transceiver that connects to a single wire bus of the data link and used to send to other nodes and receive from other nodes connected to the bus a series of symbols placed on the bus in a chosen modified form, said system comprising:

(a) a microcontroller (MCU) connected between the input device and the SED for (1) receiving magnitudes of the measurand, (2) formating the magnitudes of the measurand into address codes for selecting symbols of various pulse widths for transmitting symbols over the bus, (3) polling input and output ports connected to the transcevier in order to determine if any symbols appear on the bus, (4) initiating transmissions over the bus, (5) determining the need for inter-byte separation (IBS) during transmission, and (6) detecting and resolving issues of arbitration associated with more than one node transmitting on the bus;

(b) addressable decoder read only memory (decoder ROM) means having prestored a plurality of symbol data in the form of digital coded words which represent the various pulse widths of the various symbols used to depict the magnitudes of the measurands, having input terminals for receiving address codes from said MCU used to select the symbol data words from the decoder ROM and to place the digital coded words for the selected symbol data word at the output of the decoder ROM;

(c) transmitting means for accepting the digital coded words from the decoder ROM, forming a first series of digital pulses representing the selected symbol data words and then transmitting the serial digital pulses to the transceiver connected to the bus, a transmitter circuit of the transceiver transmitting a series of analog signals representing the first series of digital pulses over the bus to the other nodes;

(d) receiving means having an input terminal connected to the transceiver for receiving a second series of digital pulses from a receiver circuit of the transceiver, the receiver circuit converting the series of analog signals appearing on the bus into the second series of digital pulses routed away from the bus towards the MCU, said receiving means having digital filter means for filtering the second series of digital pulses to ensure bit legitimacy, said receiving means also having bit decoding means for converting the second series of digital pulses into address codes for addressing a portion of the decoder ROM containing symbol data words representing measurand information contained in the second series of digital pulses, the transmitting means and receiving means performing the transmitting and receiving of each digital pulse in a single cycle of operation;

(e) means for interrupting the sequencing of a main program of said MCU upon receipt of the second series of digital pulses and to send a received address code to said MCU to cause said MCU to translate the second series of digital pulses into the measurand information placed on the bus, said MCU providing both software and firmware control of the SED, the software control reacting with byte buffers and flags associated with a random access memory of the MCU and the firmware control reacting with a read only memory of the MCU, said MCU having a foreground program serving primarily as a task dispatcher and a background program serving primarily to provide selectable task invoked by the received addresses sent from SED.

2. Apparatus of claim 1 wherein said addressable decoder ROM means is a 4 to 10 decoder ROM for storing 16 different, 10 bit data words representative of symbols used to form the variable pulse width modultaed line codings.

* * * * *